(12) United States Patent  (10) Patent No.: US 7,542,208 B2
Gao et al.  (45) Date of Patent: Jun. 2, 2009

(54) LIGHT COLLECTING DEVICE AND LIGHT COLLECTING MIRROR

(75) Inventors: Xin Gao, Hamamatsu (JP); Hiroyuki Ohashi, Hamamatsu (JP); Kazunori Shinoda, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 11/578,067

(22) PCT Filed: Apr. 13, 2005

(86) PCT No.: PCT/JP2005/007156

§ 371 (c)(1),
(2), (4) Date: Jul. 31, 2007

(87) PCT Pub. No.: WO2005/101096

PCT Pub. Date: Oct. 27, 2005

(65) Prior Publication Data

US 2007/0279754 A1   Dec. 6, 2007

(30) Foreign Application Priority Data

Apr. 13, 2004   (JP)   ............................. 2004-118298

(51) Int. Cl.
  *G02B 27/10*   (2006.01)
  *G02B 5/10*   (2006.01)
(52) U.S. Cl. ...................... 359/619; 359/867
(58) Field of Classification Search ......... 359/618–619, 359/624, 627, 629, 726–727, 839, 850, 853, 359/867
See application file for complete search history.

(56) References Cited

U.S. PATENT DOCUMENTS

| 6,356,577 B1 | 3/2002 | Miller |
| 2003/0231497 A1* | 12/2003 | Sakata et al. ................. 362/341 |
| 2006/0152811 A1* | 7/2006 | Zheng et al. ................. 359/619 |

FOREIGN PATENT DOCUMENTS

| DE | 197 51 716 A1 | 5/1998 |
| DE | 197 51 716 C2 | 5/1998 |
| JP | 4-78180 | 3/1992 |
| JP | 7-256926 | 10/1995 |
| JP | 2003-124558 | 4/2003 |
| JP | 2003-516553 | 5/2003 |

* cited by examiner

*Primary Examiner*—Scott J Sugarman
*Assistant Examiner*—Dawayne A Pinkney
(74) *Attorney, Agent, or Firm*—Drinker Biddle & Reath LLP

(57) ABSTRACT

A beam-condensing unit has a first light source, a second light source, and a condenser mirror. The first and second light sources output a plurality of first and second light fluxes arrayed along a first direction, respectively. A condenser mirror has first and second optical plates that intersect with each other. The first optical plate includes a plurality of first reflecting portions that are arrayed along the first direction and reflect the first light fluxes, respectively. The second optical plate includes a plurality of second reflecting portions that are arrayed along the first direction alternately with the first reflecting portions and reflect the second light fluxes, respectively.

15 Claims, 14 Drawing Sheets

Fig.12
(a)
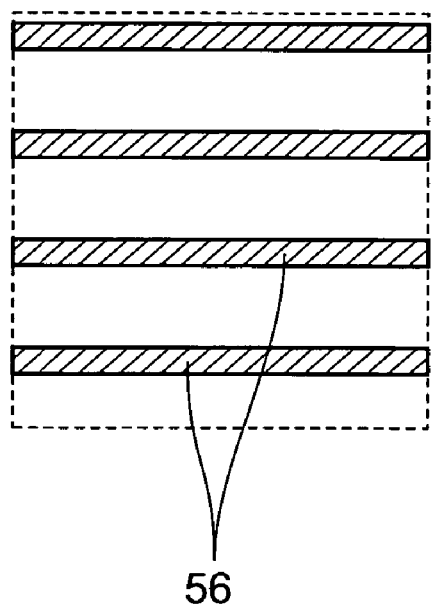
56
(b)
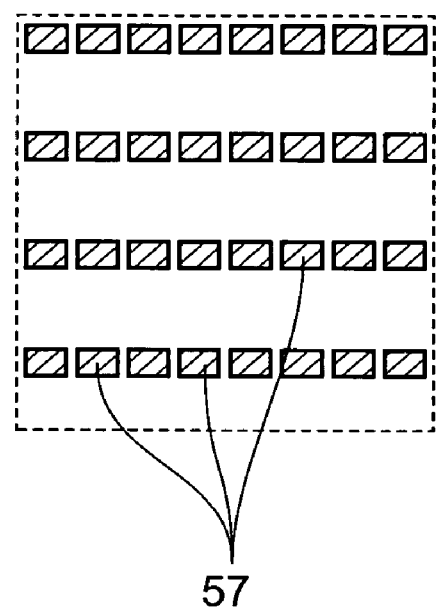
57

LIGHT COLLECTING DEVICE AND LIGHT COLLECTING MIRROR

TECHNICAL FIELD

The present invention relates to a beam-condensing unit and a condenser mirror that generate a light flux group arrayed at a high density.

BACKGROUND ART

Semiconductor lasers have been widely used as excitation light sources of solid-state lasers since these have advantages such as high efficiency, long life, and small size. Particularly, semiconductor laser array stacks have been drawing attention as semiconductor lasers that can obtain a high output. In the semiconductor laser array stack, a plurality of semiconductor laser arrays are laminated in the vertical direction. The semiconductor laser array has a plurality of emitters arrayed in the horizontal direction. In an example of the semiconductor laser array, some single-mode active layers are arrayed in a stripe form.

Since a semiconductor laser that carries out a continuous oscillation or a pulsed oscillation with a high duty ratio has a great heat value, it is necessary for a semiconductor laser array stack to have arranged a radiator plate or a heat sink between the semiconductor laser arrays. Since the radiator plate or heat sink normally has a thickness on the order of 1 to 2 mm, the semiconductor laser arrays also have an interval therebetween on the order of 1 to 2 mm. As a result, a parallel light flux group emitted from these semiconductor laser arrays forms a striped pattern within a plane vertical to optical axes of the light fluxes. Since the light flux group is arrayed at intervals corresponding to the intervals of the semiconductor laser arrays, optical density of the light flux group tends to be low.

Japanese Published Unexamined Patent Application No. Hei. 4-78180 discloses an apparatus that increases the density of a striped light flux group. By synthesizing laser light fluxes outputted by two semiconductor laser array stacks by use of a polarizing beam splitter, the apparatus generates a laser light flux group with a higher density than that of a laser light flux group emitted from a single semiconductor laser array stack.

The apparatus employs a polarizing beam splitter in order to synthesize laser light flux groups outputted by the two semiconductor laser array stacks. Therefore, by making light flux groups outputted by the respective semiconductor laser stacks incident into the polarizing beam splitter while differentiating polarizing directions thereof by 90 degrees from each other, a light flux group having a higher density can be efficiently generated. However, the apparatus cannot generate a light flux group with a higher density from laser light flux groups outputted by three or more semiconductor laser array stacks.

Moreover, in the laser light flux group outputted by the two semiconductor laser array stacks and synthesized by use of the polarizing beam splitter, fluxes having two different polarizing directions are mixed. Therefore, even when the light flux group is irradiated onto a solid-state laser medium having polarization dependency in light absorption, represented by Nd:YLF and Nd:YVO$_4$, excitation efficiency cannot be sufficiently improved.

Another apparatus for improving the density of a striped light flux group is disclosed in a German patent specification DE 197 51 716 C2. The apparatus synthesizes light flux groups outputted by three laser array stacks by use of an optical device having a structure in which a first prism plate, an optically transparent plate, and a second prism plate are stacked up in order.

DISCLOSURE OF THE INVENTION

The present invention aims to provide a beam-condensing unit and a condenser mirror that are capable of generating a high-density light flux group.

In an aspect, the present invention relates to a beam-condensing unit. The beam-condensing unit includes: a first light source that outputs a plurality of first light fluxes arrayed along a first direction; a second light source that outputs a plurality of second light fluxes arrayed along the first direction; and a condenser mirror having first and second optical plates that intersect with each other. The first optical plate includes a plurality of first reflecting portions that are arrayed along the first direction and reflect the plurality of first light fluxes, respectively. The second optical plate includes a plurality of second reflecting portions that are arrayed along the first direction alternately with the first reflecting portions and reflect the plurality of second light fluxes, respectively.

Since the first and second light fluxes arrayed along the first direction are reflected by the first and second reflecting portions arrayed alternately along the first direction, respectively, it is possible to synthesize the first and second light fluxes so as to generate a light flux group having a higher density. Since the beam-condensing unit necessitates no polarizing beam splitter, it is also possible to synthesize light fluxes from the respective light sources with polarizing directions thereof remaining aligned.

The plurality of first light fluxes may have optical axes parallel to each other. The plurality of second light fluxes may also have optical axes parallel to each other. The first and second optical plates may be arranged so that the optical axes of the first light fluxes reflected by the first reflecting portions become parallel to the optical axes of the second light fluxes reflected by the second reflecting portions.

Each of the first light fluxes may have a cross section slender in a second direction vertical to the first direction and be collimated within a plane vertical to the second direction. Each of the second light fluxes may have a cross section slender in a third direction vertical to the first direction and be collimated within a plane vertical to the third direction. With this construction, a light flux group from the first light source and a light flux group from the second light source are prevented from overlapping in the first direction, whereby optical density can be efficiently increased.

The first light source may have: a plurality of first semiconductor laser arrays that are laminated along the first direction and generate the plurality of first light fluxes, respectively; and a first collimator that receives the plurality of first light fluxes from the plurality of first semiconductor laser arrays and collimates the same within a plane vertical to the second direction. The second light source may have: a plurality of second semiconductor laser arrays that are laminated along the first direction and generate the plurality of second light fluxes, respectively; and a second collimator that receives the plurality of second light fluxes from the plurality of second semiconductor laser arrays and collimates the same within a plane vertical to the third direction. With this construction, the first and second light sources can output light flux groups whose polarizing directions are aligned. As a result, it becomes easy to synthesize the light flux groups from the first and second light sources with the polarizing directions remaining aligned.

The first optical plate may have one or more first opening portions arrayed along the first direction alternately with the first reflecting portions. The second optical plate may have one or more second opening portions arrayed along the first direction alternately with the second reflecting portions. One or more of the first reflecting portions may penetrate through the second opening portions, and one or more of the second reflecting portions may penetrate through the first opening portions.

The beam-condensing unit according to the present invention may further include a third light source that outputs a plurality of third light fluxes arrayed along the first direction. The condenser mirror may have a plurality of light passing portions that are arrayed along the first direction and allows the plurality of third light fluxes to pass, respectively. The first reflecting portions, the second reflecting portions, and the light passing portions may be repeatedly arrayed along the first direction in a fixed order. The light passing portions may be opening portions or may be constructed by an optically transparent substance. With this construction, as a result of the third light fluxes arrayed along the first direction passing through the light passing portions arrayed along the first direction, the first, second, and third light fluxes are repeatedly arrayed along the first direction in a fixed order, thus a light flux group having a higher density is generated.

The plurality of first light fluxes may have optical axes parallel to each other, the plurality of second light fluxes may have optical axes parallel to each other, and the plurality of third light fluxes may have optical axes parallel to each other. The first and second optical plates may be arranged so that the third light fluxes pass through the light passing portions and the optical axes of the third light fluxes that have passed through the light passing portions become parallel to the optical axes of the first and second light fluxes reflected by the first and second reflecting portions.

The first optical plate may have one or more first opening portions arrayed along the first direction alternately with the first reflecting portions. The second optical plate may have one or more second opening portions arrayed along the first direction alternately with the second reflecting portions. One or more of the first reflecting portions may penetrate through the second opening portions, and one or more of the second reflecting portions may penetrate through the first opening portions. The first and second opening portions may include gaps formed between the first and second reflecting portions as the light passing portions.

When the beam-condensing unit includes the above-described third light source, the condenser mirror may further have a third optical plate that intersects with the first and second optical plates. The third optical plate may include a plurality of third reflecting portions that are arrayed along the first direction and reflect the plurality of third light fluxes, respectively. The first, second, and third reflecting portions may be repeatedly arrayed along the first direction in a fixed order. With this construction, as a result of the third light fluxes arrayed along the first direction being reflected by the third reflecting portions arrayed along the first direction, the first, second, and third light fluxes are repeatedly arrayed along the first direction in a fixed order, thus a light flux group having a higher density is generated.

The plurality of first light fluxes may have optical axes parallel to each other, the plurality of second light fluxes may have optical axes parallel to each other, and the plurality of third light fluxes may have optical axes parallel to each other. The first, second, and third optical plates may be arranged so that the optical axes of the first, second, and third light fluxes reflected by the first, second, and third reflecting portions become parallel to each other.

The third optical plate may further have one or more third opening portions arrayed along the first direction alternately with the third reflecting portions. One or more of the third reflecting portions may penetrate through the first and second opening portions, and one or more of the first reflecting portions and one or more of the second reflecting portions may penetrate through the third opening portions.

Each of the third light fluxes may have a cross section slender in a fourth direction vertical to the first direction and be collimated within a plane vertical to the fourth direction. With this construction, light flux groups from the first, second, and third light sources are prevented from overlapping in the first direction, whereby optical density can be efficiently increased.

The third light source may have: a plurality of third semiconductor laser arrays that are laminated along the first direction and generate the plurality of third light fluxes, respectively; and a third collimator that receives the plurality of third light fluxes from the plurality of third semiconductor laser arrays and collimates the same within a plane vertical to the fourth direction. With this construction, the third light source can output a parallel light flux group whose polarizing directions are aligned. As a result, it becomes easy to increase optical density with the polarizing directions remaining aligned.

In another aspect, the present invention relates to a condenser mirror. The condenser mirror includes: a first optical plate having a plurality of first reflecting portions arrayed along a first direction; and a second optical plate that intersects with the first optical plate. The second optical plate has a plurality of second reflecting portions arrayed along the first direction alternately with the first reflecting portions.

When a plurality of light fluxes arrayed along the first direction are irradiated onto the first and second reflecting portions arrayed alternately along the first direction, respectively, it is possible to generate a light flux group arrayed alternatively along the first direction and having a higher density. Since the condenser mirror necessitates no polarizing beam splitter, it is possible to synthesize a plurality of light fluxes with polarizing directions thereof remaining aligned so as to increase optical density.

The first optical plate may have one or more first opening portions arrayed along the first direction alternately with the first reflecting portions. The second optical plate may have one or more second opening portions arrayed along the first direction alternately with the second reflecting portions. One or more of the first reflecting portions may penetrate through the second opening portions, and one or more of the second reflecting portions may penetrate through the first opening portions.

The condenser mirror according to the present invention may further include a plurality of light passing portions arrayed along the first direction. The first reflecting portions, the second reflecting portions, and the light passing portions may be repeatedly arrayed along the first direction in a fixed order. The light passing portions may be opening portions or may be constructed by an optically transparent substance. When a plurality of light fluxes arrayed along the first direction are made to pass through the light passing portions, it is possible to synthesize these passing light fluxes with light fluxes reflected by the first and second reflecting portions so as to generate a light flux group having a higher density.

The first optical plate may have one or more first opening portions arrayed along the first direction alternately with the first reflecting portions. The second optical plate may have one or more second opening portions arrayed along the first direction alternately with the second reflecting portions. One or more of the first reflecting portions may penetrate through the second opening portions, and one or more of the second reflecting portions may penetrate through the first opening portions. The first and second opening portions include gaps formed between the first and second reflecting portions as the light passing portions.

The condenser mirror according to the present invention may further include a third optical plate that intersects with the first and second optical plates. The third optical plate may have a plurality of third reflecting portions arrayed along the first direction and one or more third opening portions arrayed along the first direction alternately with the third reflecting portions. The first, second, and third reflecting portions may be repeatedly arrayed along the first direction in a fixed order. One or more of the third reflecting portions may penetrate through the first and second opening portions, and one or more of the first reflecting portions and one or more of the second reflecting portions may penetrate through the third opening portions. When a plurality of light fluxes arrayed along the first direction are irradiated onto the third reflecting portions, it is possible to synthesize light fluxes reflected by the first, second, and third reflecting portions so as to generate a light flux group having a higher density.

The present invention will become more fully understood from the detailed description given hereinbelow and the accompanying drawings. It should be noted, however, that the accompanying drawings are given by way of illustration only and do not intend to limit the scope of the present invention.

BRIEF DESCRIPTION OF THE DRAWINGS

FIG. 12 are views showing light flux groups outputted by a semiconductor laser array stack.

DESCRIPTION OF REFERENCE SYMBOLS

Figure 1:
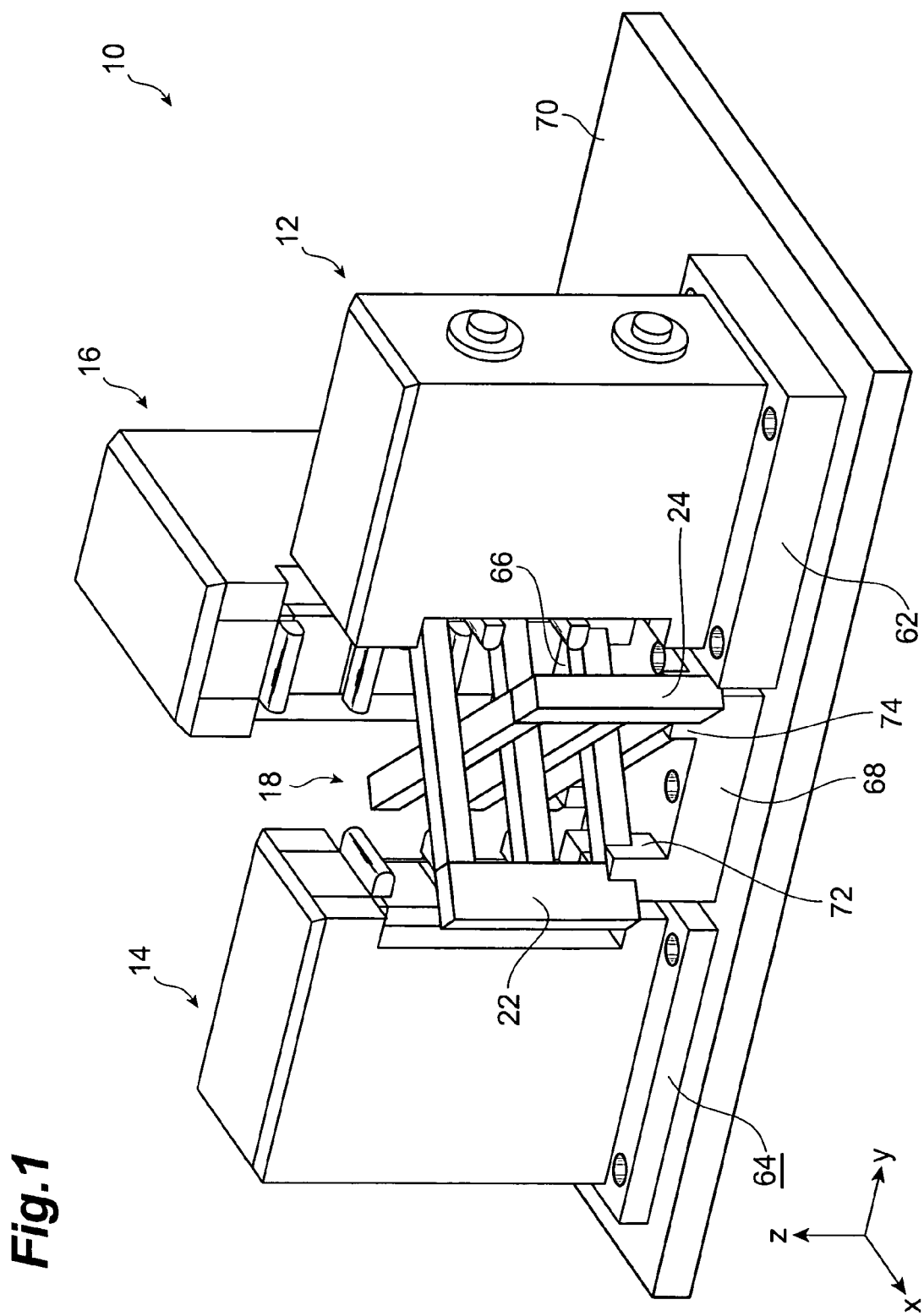
FIG. 1 is a perspective view of a beam-condensing unit according to a first embodiment.

10, 30 . . . Beam-condensing unit, 12,32 . . . First light source, 14, 34 . . . Second light source, 16, 36 . . . Third light source, 18, 40 . . . Condenser mirror, 20 . . . Collimator lens, 22, 42 . . . First optical plate, 24, 44 . . . Second optical plate, 26 . . . Semiconductor laser array stack, 27 . . . Semiconductor laser array, 28 . . . Heat sink, 38 . . . Fourth light source, 46 . . . Third optical plate, 48 . . . Fourth optical plate.

BEST MODE FOR CARRYING OUT THE INVENTION

Hereinafter, embodiments of a beam-condensing unit and a condenser mirror according to the present invention will be described in detail with reference to the accompanying drawings. Here, in the description of the drawings, identical or equivalent elements are designated with identical numerical symbols so as to avoid redundant descriptions. Dimensional ratios of the drawings are not always coincident with those in the description. In addition, for convenience of description, xyz orthogonal coordinates are shown in the drawings where it is possible.

First Embodiment

Figure 2:
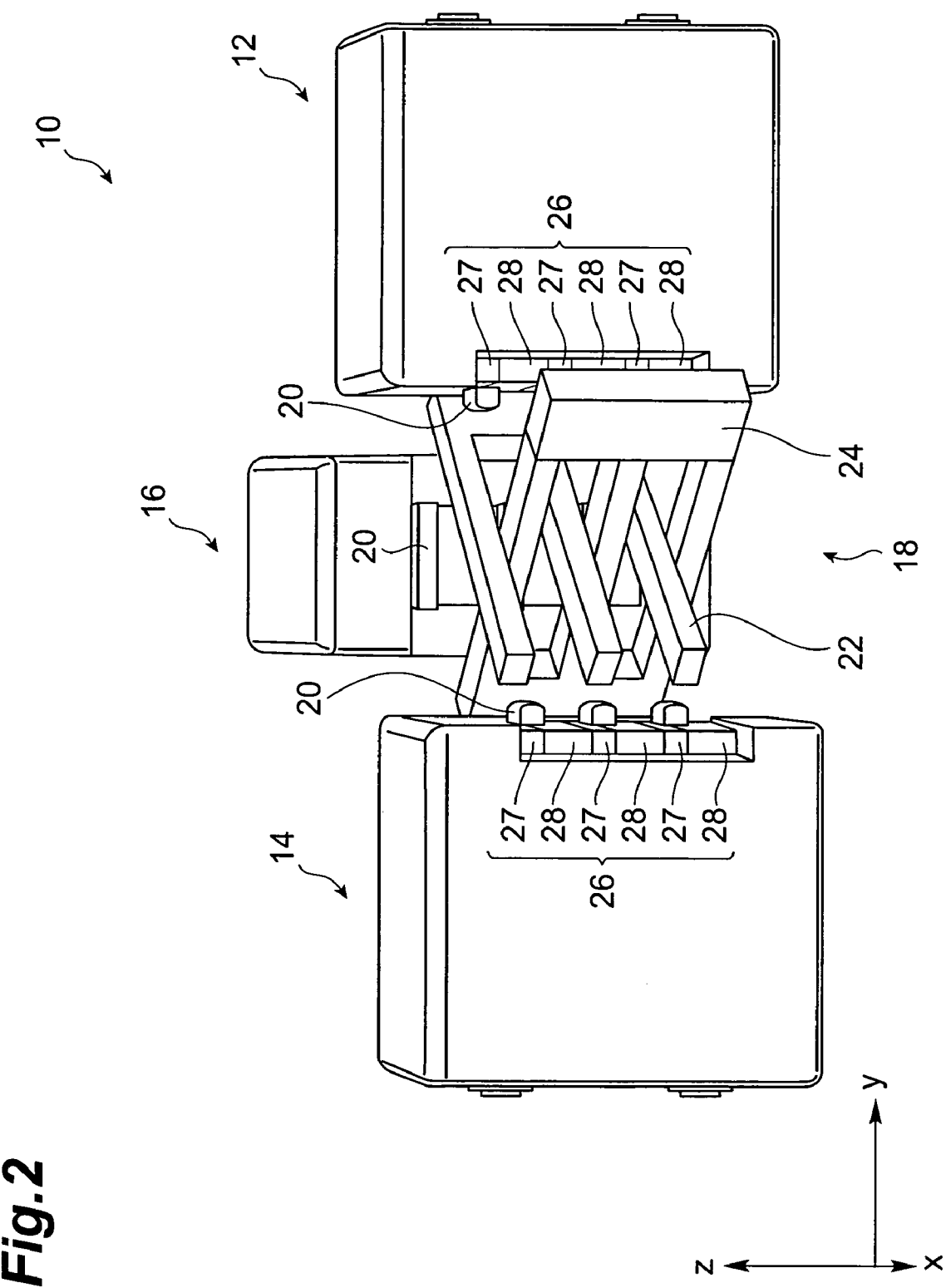
FIG. 2 is a schematic perspective view of the beam-condensing unit according to the first embodiment, viewed from an angle different from FIG. 1.
Figure 3:
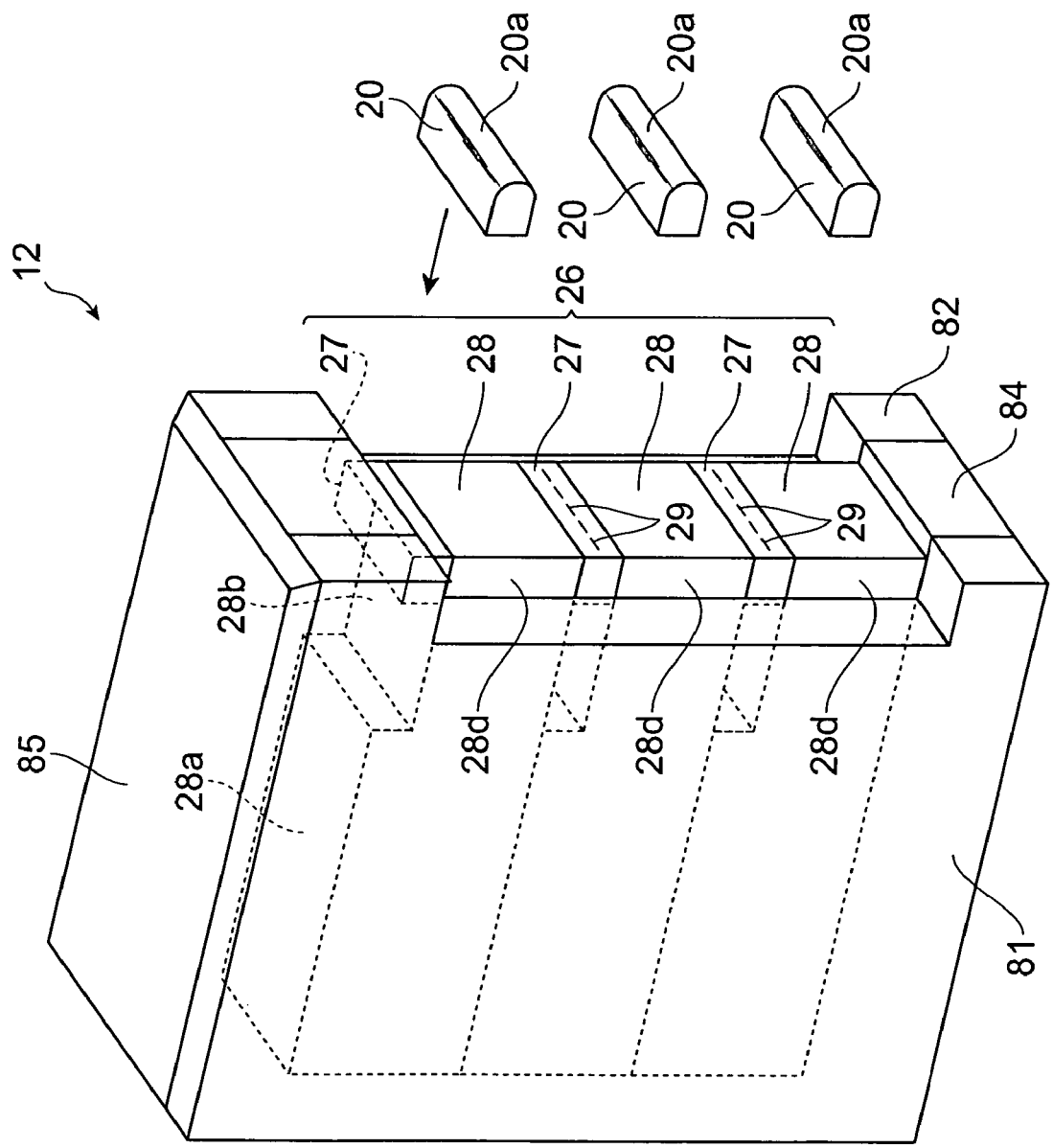
FIG. 3 is an exploded perspective view showing a light source in the beam-condensing unit.
Figure 4:
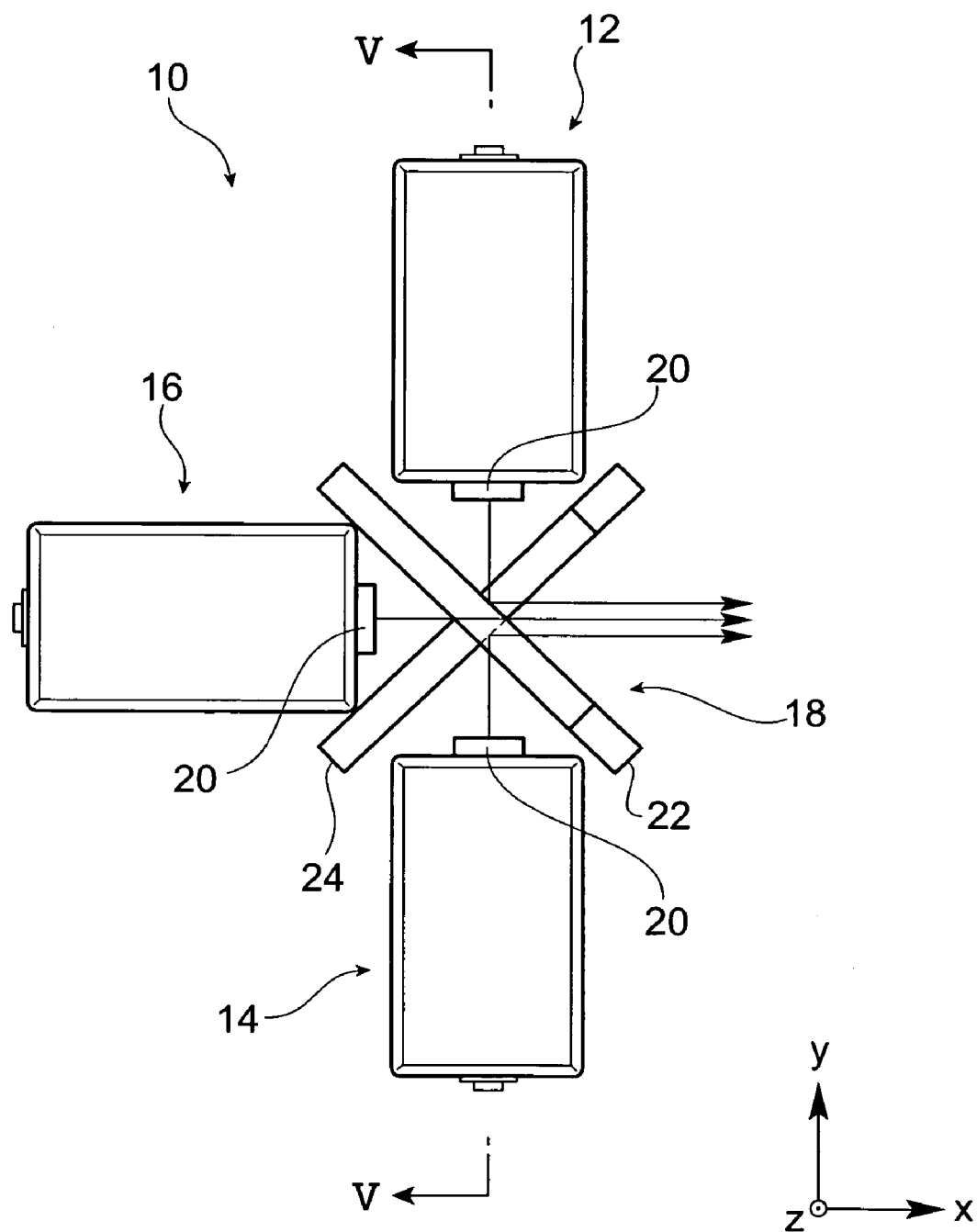
FIG. 4 is a top view of the beam-condensing unit according to the first embodiment.
Figure 5:
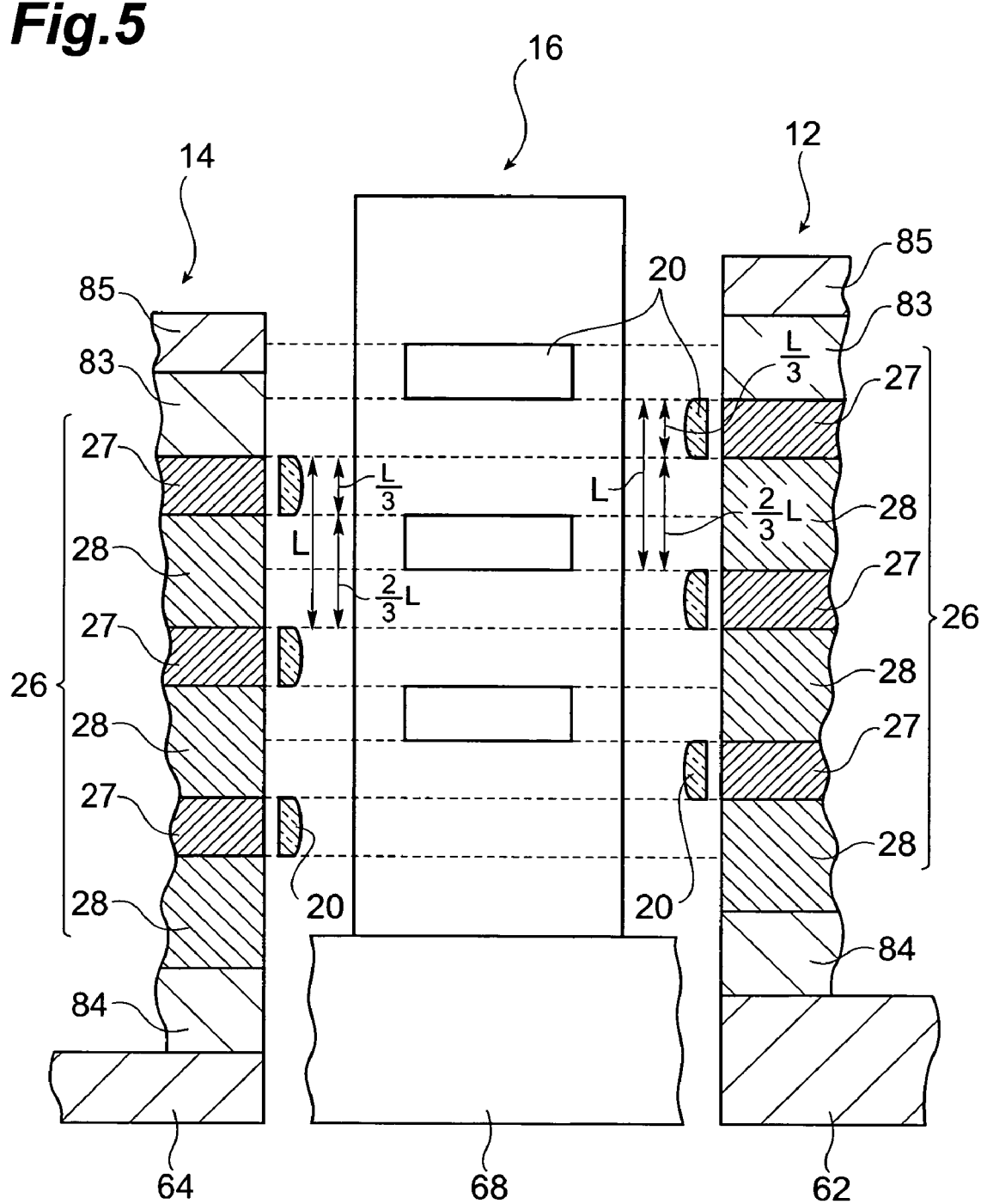
FIG. 5 is a schematic sectional view along a line V-V of FIG. 4.
Figure 6:
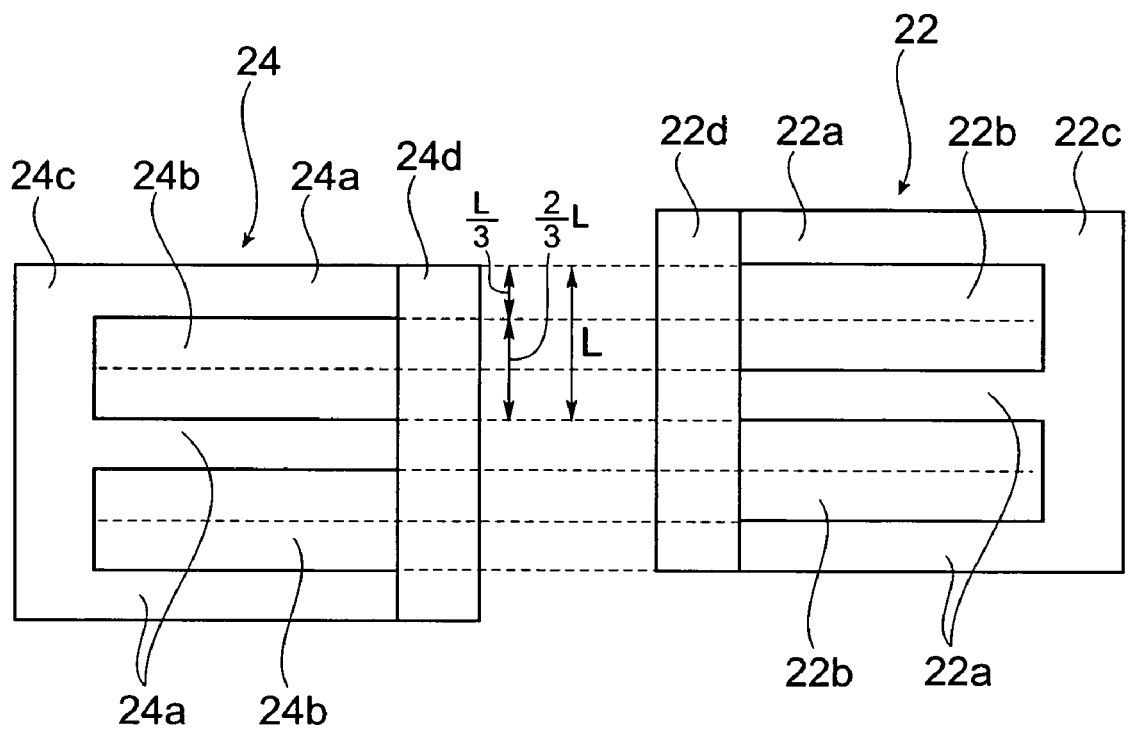
FIG. 6 is a schematic view showing optical plates to construct a condenser mirror.
Figure 7:
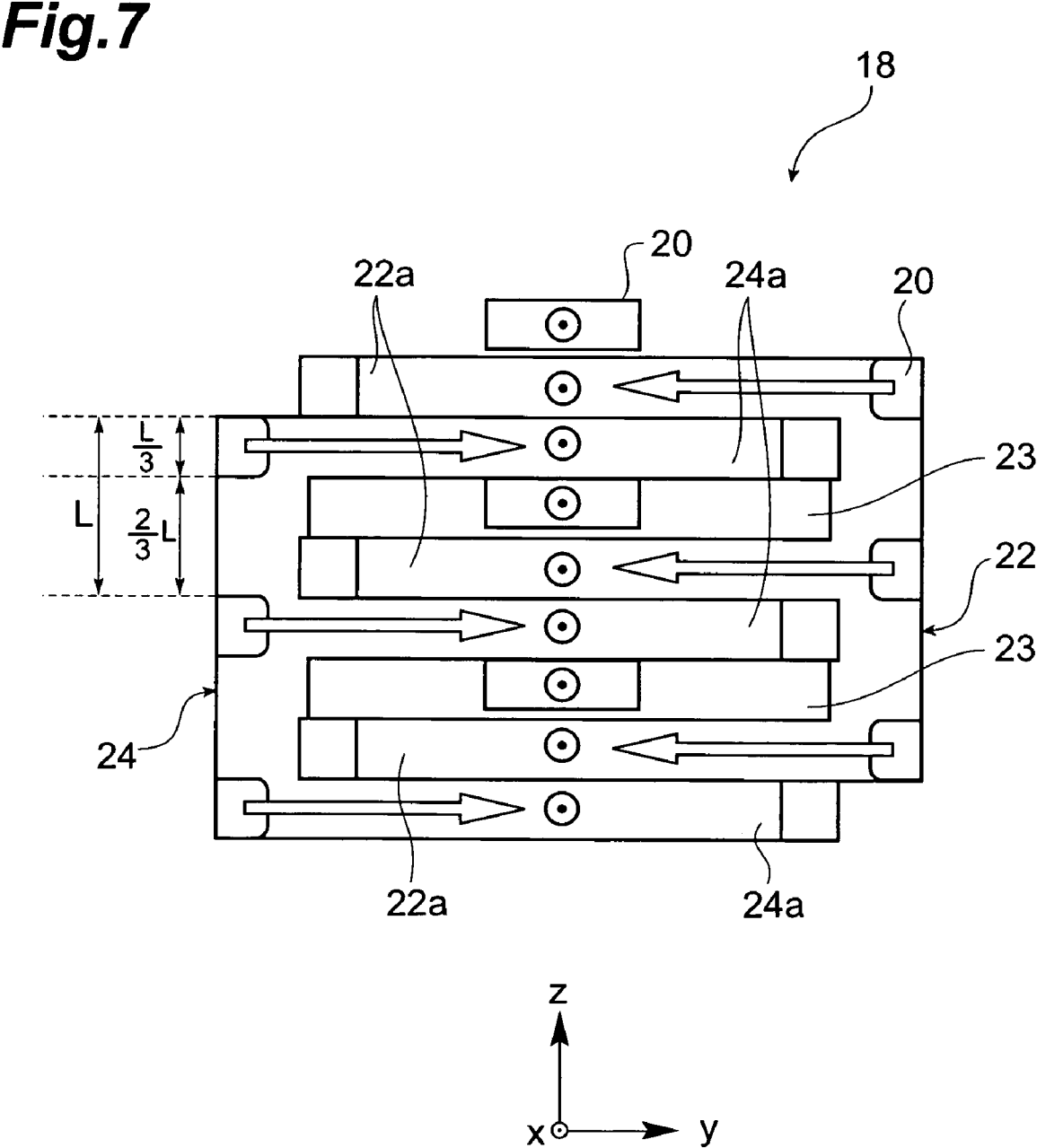
FIG. 7 is a front view showing the condenser mirror.
Figure 8:
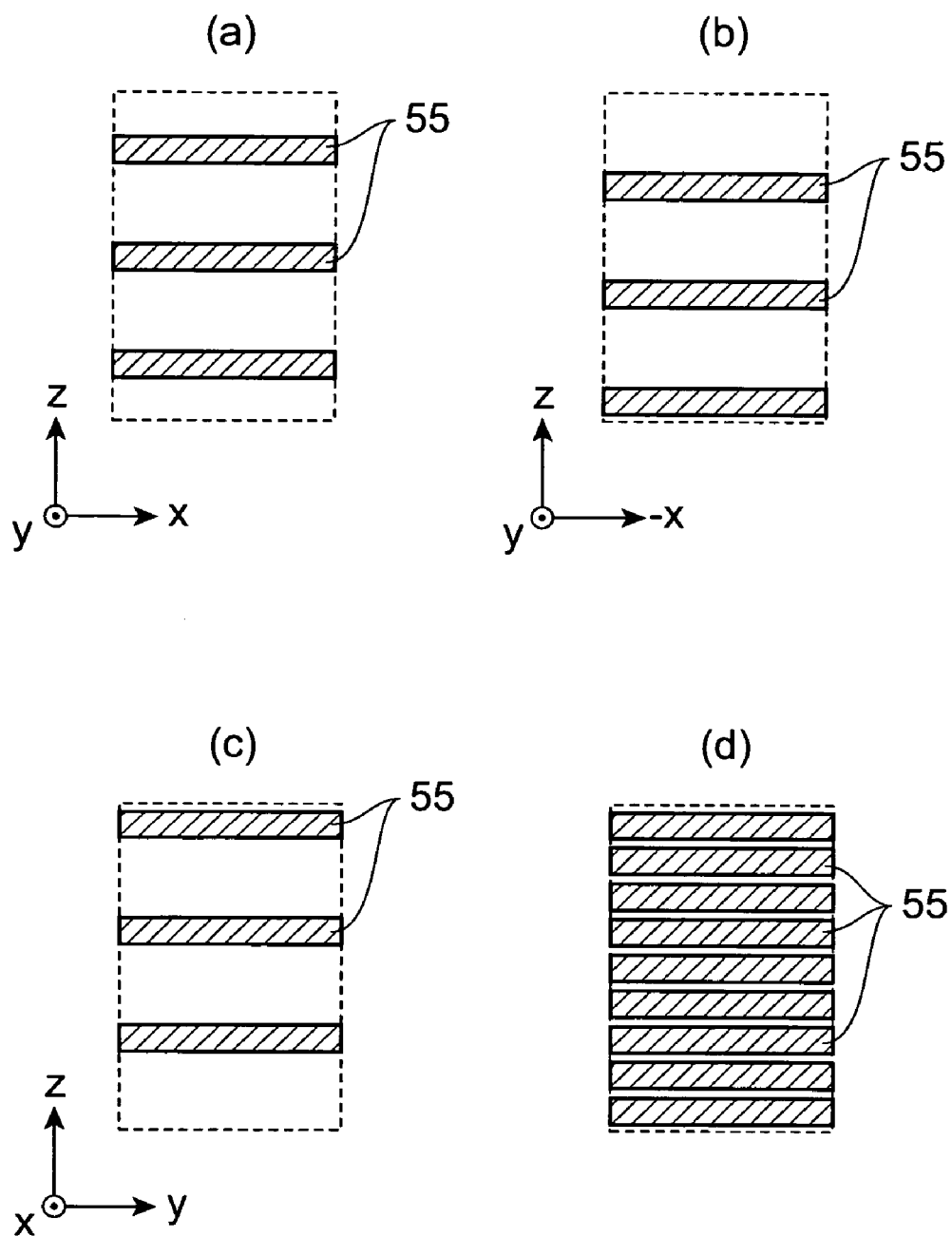
FIG. 8 are views showing a manner that light is synthesized by the beam-condensing unit according to the first embodiment.

Referring to FIG. 1 and FIG. 8, a first embodiment according to the present invention will be described. FIG. 1 is a perspective view showing a beam-condensing unit of the present embodiment, and FIG. 2 is a perspective view of the beam-condensing unit simplified and viewed from an angle different from FIG. 1. FIG. 3 is an exploded perspective view showing a light source in the beam-condensing unit. FIG. 4 is a plan view of the beam-condensing unit viewed along the z-axis direction, and FIG. 5 is a schematic sectional view along a line V-V of FIG. 4. FIG. 6 is a schematic view showing optical plates to construct a condenser mirror used in the beam-condensing unit, FIG. 7 is a front view showing the condenser mirror, and FIG. 8 are views showing a manner that light is synthesized by the beam-condensing unit.

As shown in FIG. 1 and FIG. 2, a beam-condensing unit 10 is constructed by a first light source 12, a second light source 14, a third light source 16, and a condenser mirror 18. In the following, an emitting direction of light from the beam-condensing unit 10 is provided as an x-direction, and a laminating direction of a semiconductor laser array stack 26 (described later) in each light source, as a z-direction, and a direction vertical to both of these, as a y-direction, so as to set coordinate axes (x-axis, y-axis, and z-axis).

As shown in FIG. 2, the first light source 12 is arranged so as to emit light in a −y-direction. As shown in FIG. 3, the light source 12 has a semiconductor laser array stack 26 and a plurality of collimator lenses 20. The semiconductor laser array stack 26 has a structure in which a plurality of (in the present embodiment, three) semiconductor laser arrays 27 and a plurality of (in the present embodiment, three) heat sinks 28 are alternately laminated along the z-axis direction.

An axial direction (resonator direction) of each semiconductor laser array 27 is equal to the y-direction, and a light emitting surface of each semiconductor laser array 27 is parallel to a zx-plane. The direction vertical to a pn-junction surface of the semiconductor laser array 27 is called a fast axis direction. The direction vertical to both the axial direction and fast axis direction is called a slow axis direction. In the present embodiment, the fast axis direction is equal to the z-axis direction, and the slow axis direction is equal to the x-axis direction.

Each semiconductor laser array 27 has a plurality of emitters 29 arrayed at equal intervals along the slow axis direction, that is, the x-axis direction. In the present embodiment, each semiconductor laser array 27 has a plurality of active areas arrayed in parallel along the slow axis direction (x-axis direction), and laser light fluxes are emitted in the −y-direction from the respective active areas.

In the present embodiment, light fluxes emitted from the plurality of emitters 29 of each semiconductor laser array 27 are mixed with each other so as to form one light flux. The light flux has a pattern slender in the array direction of the emitters 29, that is, the x-axis direction, within a plane vertical to the axial direction of the semiconductor laser array 27, that is, a zx-plane.

A heat sink 28 is a member to cool the semiconductor laser array 27, and an example thereof is a water-cooled plate. Each heat sink 28 has an upper level portion 28a and a lower level portion 28b that form a step-like upper surface. The semiconductor laser array 27 is loaded at the front end of a lower level portion 28c. In the following, a part 28d of the heat sink 28 at which the semiconductor laser array 27 is loaded will be called a laser array loading portion.

A light emitting surface of the semiconductor laser array stack 26 is formed by arranging the light emitting surface of the semiconductor laser array 27 and the front end face of the heat sink 28 alternately. Accordingly, from the light emitting surface of the semiconductor laser array stack 26, slender light fluxes that are the same in number of the semiconductor laser arrays 27 are outputted. As shown in FIG. 8(a), a group of these light fluxes 55 is arrayed in parallel along the z-axis direction and forms a striped pattern within a plane vertical to axes of these light fluxes 55. A longitudinal direction of each stripe is equal to the array direction of the emitters 29, that is, the slow axis direction (x-axis direction) of the semiconductor laser array 27.

Referring again to FIG. 3, both side surfaces of the semiconductor laser array stack 26 are covered with side covers 81 and 82. Square-shaped top plate 83 and bottom plate 84 are installed on and under the semiconductor laser array stack 26. On the side covers 81 and 82 and top plate 83, an upper cover 85 is installed. On the surface of the upper cover 85, an electrode plate to supply a drive voltage to the semiconductor laser array stack 26 may be installed.

A light flux emitted from the semiconductor laser normally has a small spread in the slow axis direction (x-axis direction) but has a relatively large spread angle in the fast axis direction (z-axis direction). Therefore, for the purpose of suppressing the spread angle in the z-axis direction so as to improve condensing efficiency, the collimator lenses 20 are installed in the light source 12. The collimator lens 20 is also called an FAC (Fast Axis Collimator) and collimates a laser light flux from the semiconductor laser array 27 in the fast axis direction of the semiconductor laser array 27. In other words, the collimator lens 20 collimates a light flux outputted by the semiconductor laser array 27 within a plane vertical to the array direction of the emitters 29, that is, a yz-plane.

However, the light flux that has passed through the collimating means is not completely collimated in a strict sense depending on the design of the collimating means and has a slight spread or narrowing angle as the light flux proceeds in some cases. Being "parallel" in the present specification also includes a case where the light flux has such a slight angle, that is, the light flux is substantially parallel.

In the present embodiment, cylindrical lenses each having, as a lens surface 20a, a cylindrical surface having a generatrix along the slow axis direction (x-axis direction) of the semiconductor laser array 27 are used as the collimator lenses 20.

These collimator lenses 20 are arrayed along the z-axis direction and correspond one on one with the semiconductor laser arrays 27. Each collimator lens 20 is installed in front (the side further in the −y-direction than the light emitting surface) of the light emitting surface of the corresponding semiconductor laser array 27, adjacent to the light emitting surface. A light flux that is made incident into the collimator lens 20 from the semiconductor laser array 27 is bent within a plane (yz-plane) vertical to the generatrix of the collimator lens 20 and collimated. As a result, the first light source 12 outputs a group of light fluxes arrayed in parallel along the z-axis direction. The collimator lens 20 can be fixed in front of the semiconductor laser array stack 26 by an arbitrary method. For example, a cover (unillustrated) to cover the light emitting surface of the laser array stack 26 may be attached to the top plate 83 and bottom plate 84, and the collimator lens 20 may be fixed to the cover.

The second light source 14 is arranged so as to emit light in a +y-direction. The second light source 14 has the same structure as that of the first light source 12 and therefore has a semiconductor laser array stack 26 and a plurality of collimator lenses 20. The laser array stack 26 has a structure where a plurality of semiconductor laser arrays 27 and a plurality of heat sinks 28 are alternately laminated along the z-axis direction. The collimator lenses 20 in the second light source 14 each collimate a laser light flux from the semiconductor laser array 27 in the fast axis direction. In other words, the collimator lenses 20 each collimate the light flux within a plane (yz-plane) vertical to the array direction of emitters 29. As shown in FIG. 8(b), a group of light fluxes 55 outputted by the second light source 14 is arrayed along the z-axis direction and forms a striped pattern within a plane vertical to optical axes of these light fluxes 55. A longitudinal direction of each stripe is equal to the array direction of the emitters 29, that is, the slow axis direction (x-axis direction) of the semiconductor laser array 27.

The third light source 16 is arranged so as to emit light in a +x-direction. The third light source 16 has the same structure as that of the first light source 12 and the second light source 14 and therefore has a semiconductor laser array stack 26 and a plurality of collimator lenses 20. The laser array stack 26 has a structure where a plurality of semiconductor laser arrays 27 and a plurality of heat sinks 28 are alternately laminated along the z-axis direction. With regard to semiconductor laser arrays 27 in the third light source 16, the axial direction is equal to the x-axis direction, the fast axis direction is equal to the z-axis direction, and the slow axis direction is equal to the y-axis direction. In the semiconductor laser array 27, a plurality of emitters 29 are arrayed at equal intervals along the y-axis direction. Each of the collimator lenses 20 in the third light source 16 collimates a laser light flux from the semiconductor laser array 27 in the fast axis direction. In other words, the collimator lenses 20 each collimate the light flux within a plane (zx-plane) vertical to the array direction of the emitters 29. As shown in FIG. 8(c), a group of light fluxes 55 outputted by the third light sources 16 is arrayed along the z-axis direction and forms a striped pattern within a plane vertical to optical axes of these light fluxes 55. A longitudinal direction of each stripe is equal to the array direction of the emitters 29, that is, the slow axis direction (y-axis direction) of the semiconductor laser array 27.

Each of the light sources 12, 14, and 16 has, as shown in FIG. 5, three semiconductor laser arrays 27. Among the light sources 12, 14, and 16, the positions of the semiconductor laser arrays 27 are shifted in a fixed order along the z-axis direction. Where the stack interval of the semiconductor laser arrays 27 in each laser array stack 26 is provided as L, the thickness (length in the z-axis direction) of each semiconductor laser array 27 is provided as L/3, and the thickness (length in the z-axis direction) of the laser array loading portion 28d of each heat sink 28 is provided as 2L/3, the positions of the semiconductor laser arrays 27 in the beam-condensing unit 10 are shifted by L/3 along the z-axis direction. More concretely, the semiconductor laser arrays 27 in the three light sources are arranged, from the top to the bottom in FIG. 5, while being shifted by L/3 in an order of the third light source 16, the first light source 12, and the second light source 14 without being overlapped in the z-axis direction.

As shown in FIG. 1, FIG. 2, and FIG. 4, the condenser mirror 18 is formed by fitting a first optical plate 22 and a second optical plate 24 together so as to intersect at 90 degrees when viewed from the z-axis direction. As shown in FIG. 6, the first optical plate 22 has reflecting portions 22a and light passing portions 22b having rectangular planar shapes. The reflecting portions 22a and light passing portions 22b are alternately arrayed in a stripe form along the z-axis direction.

The respective reflecting portions 22a are provided so as to reflect laser light fluxes from the first light source 12. These reflecting portions 22a have the same dimensions and are arrayed at equal intervals. Of the reflecting portions 22a, surfaces on the + side in the x-axis direction, that is, surfaces opposed to the first light source 12 are provided as mirror surfaces that reflect laser light fluxes.

The light passing portions 22b are provided to allow laser light fluxes from the third light source 16 to pass and are provided as openings in the present embodiment. These light passing portions 22b have the same dimensions and are arrayed at equal intervals. The width of the light passing portion 22b is twice the width of the reflecting portion 22a. Where an array interval of the reflecting portions 22a and light passing portions 22b in the first optical plate 22 is provided as L, the width of the reflecting portion 22a is L/3, and the width of the light passing portion 22b is 2L/3. Here, the array interval L is equal to the stack interval of the semiconductor laser arrays 27 in the laser array stack 26.

The first optical plate 22 further has, at one end in a longitudinal direction of the reflecting portions 22a, a supporting portion 22c that extends vertically to the longitudinal direction. The reflecting portions 22a and supporting portion 22c form a comb tooth shape. At the other end in the longitudinal direction of the reflecting portions 22a, a detachable support plate 22d is attached parallel to the supporting portion 22c.

The second optical plate 24 has the same structure as that of the first optical plate 22. Namely, the second optical plate 24 has, as shown in FIG. 6, reflecting portions 24a and light passing portions 24b having rectangular planar shapes. The reflecting portions 24a and light passing portions 24b are alternately arrayed in a stripe form along the z-axis direction. The dimensions of the reflecting portions 24a and light passing portions 24b are the same as those of the reflecting portions 22a and light passing portions 22b of the first optical plate 22, respectively. The second optical plate 24 further has, at one end in a longitudinal direction of the reflecting portions 24a, a supporting portion 24c that extends vertically to the longitudinal direction, and the reflecting portions 24a and supporting portion 24c form a comb tooth shape. At the other end in the longitudinal direction of the reflecting portions 24a, a detachable support plate 24d is attached parallel to the supporting portions 24c.

The first optical plate 22 and the second optical plate 24 are fitted together by inserting the reflecting portions 22a of the first optical plate 22 into the light passing portions 24b of the second optical plate 24 and inserting the reflecting portions 24a of the second optical plate 24 into the light passing portions 22b of the first optical plate 22. The condenser mirror 18 is thereby assembled. The condensing mirror is as in FIG. 7 when this is viewed from the front. Here, for ease in viewing, the support plate 22d of the first optical plate 22 and the support plates 22d and 24d of the first optical plate 22 and the second optical plate 24 are omitted in FIG. 2 and FIG. 7, respectively.

As shown in FIG. 4 and FIG. 7, the first optical plate 22 is arranged so that a group of parallel light fluxes outputted by the first light source 12 is made incident into the reflecting portions 22a and is reflected in the +x-direction. The longitudinal direction of the reflecting portions 22a is included within an xy-plane at an angle of 135 degrees with respect to the x-axis. The second optical plate 24 is arranged so that a group of parallel light fluxes outputted by the second light source 14 is made incident into the reflecting portions 24a and is reflected in the +x-direction. The longitudinal direction of the reflecting portions 24a is included within an xy-plane at an angle of 45 degrees with respect to the x-axis. As a result, the first optical plate 22 and the second optical plate 24 intersect with each other while forming angles of 90 degrees.

Furthermore, the first optical plate 22 and the second optical plate 24 are arranged so that parallel light fluxes outputted by the third light source 16 pass through overlapping parts 23 of the light passing portions 22b and 24b. Here, a light flux that is emitted from the semiconductor laser array 27 positioned highest in the third light source 16 passes outside and above the condensing mirror 18 without passing through the overlapping part 23.

As such, light fluxes outputted by the third light source 16 pass through the overlapping parts 23 or pass outside the condensing mirror 18 and then proceed in the +x-direction. Accordingly, the optical axis directions of the parallel light flux group outputted by the first light source 12 and reflected by the first optical plate 22, the parallel light flux group outputted by the first light source 14 and reflected by the second optical plate 24, and the parallel light fluxes outputted by the third light source and passed through the overlapping parts 23 are all identical, that is, the x-axis direction, and these parallel light fluxes proceed in the +x-direction.

As shown in FIG. 1, the light sources 12, 14, and 16 are placed on flat plate-like installation tables 62, 64, and 66, respectively. These installation tables have different heights, and therefore, as shown in FIG. 5, the positions of the semiconductor laser arrays 27 in the light sources 12, 14, and 16 are shifted along the z-direction. The condenser mirror 18 is fixed to the top of an installation table 68. The installation tables 62, 64, 66, and 68 are fixed to the upper surface of a flat plate 70. The installation table 68 has two supporting portions 72 protruded from the upper surface of the installation table 68 and diagonally arranged. The respective supporting portions 72 have grooves that are the same in depth, and into these grooves, the optical plate 22 is inserted and fixed. The installation table 68 also has two other supporting portions 74 protruded from the upper surface of the installation table 68 and diagonally arranged. The respective supporting portions 74 have grooves that are the same in depth, and into these grooves, the optical plate 24 is inserted and fixed. The grooves of the supporting portions 72 are shallower than the grooves of the supporting portions 74, and therefore, the optical plate 22 is arranged higher in position than the optical plate 24. Here, in FIG. 2, the installation tables 62, 64, 66, and 68 and the flat plate 70 are omitted.

Subsequently, actions of the beam-condensing unit 10 and condenser mirror 18 will be described. FIGS. 8(a) to (c) are sectional views where light flux groups emitted from the first light source 12, the second light source 14, and the third light source 16, respectively, are sectioned vertically to their respective optical axes. FIG. 8(*d*) is a sectional view where a group of parallel light fluxes 55 formed by synthesizing a light flux group emitted from the first light source 12 and reflected by the first optical plate 22, a light flux group emitted from the second light source 14 and reflected by the second optical plate 24, and a light flux group emitted from the third light source 16 and passed inside or outside the condenser mirror 18 is sectioned vertically to their optical axes.

Since the light flux groups outputted by the light sources 12, 14, and 16 have been collimated by the collimator lenses 20, these form, as shown in FIGS. 8(*a*), (*b*), and *c*), striped patterns where the stripes are parallel to each other and are arrayed at equal intervals. As shown in FIG. 5, among the light sources 12, 14, and 16, the positions of the semiconductor laser arrays 27 are shifted along the z-direction. In addition, the reflecting portions 22*a* and 24*a* and the overlapping parts 23 of the light passing portions are repeatedly arrayed in a fixed order along the z-direction without overlapping with each other. As a result, light flux groups reflected by the reflecting portions 22*a* and 24*a* and a light flux group that passes through the condensing mirror 18 proceed in an identical direction (+x-direction) without overlapping with each other, and sections thereof have a pattern as shown in FIG. 8(*d*). Accordingly, a group of light fluxes formed by synthesizing the reflected light flux groups and passed light flux group has a density three times as high as that of the respective light flux groups outputted by the light sources 12, 14, and 16.

Laser light fluxes outputted by the first light source 12 have a polarizing direction vertical to the fast axis direction of the semiconductor laser arrays 27, that is, a polarizing direction parallel to the x-axis, and proceed in the −y-direction. Accordingly, these laser light fluxes become laser light fluxes that have a polarizing direction parallel to the y-axis and proceed in the +x-direction when being reflected by the reflecting portions 22*a* of the first optical plate 22.

Laser light fluxes outputted by the second light source 14 have a polarizing direction vertical to the fast axis direction of the semiconductor laser arrays 27, that is, a polarizing direction parallel to the y-axis, and proceed in the +y-direction. Accordingly, these laser light fluxes become laser light fluxes that have a polarizing direction parallel to the y-axis and proceed in the +x-direction when being reflected by the reflecting portions 24*a* of the second optical plate 24.

Laser light fluxes outputted by the third light source 16 have a polarizing direction vertical to the fast axis direction of the semiconductor laser arrays 27, that is, a polarizing direction parallel to the x-axis, and proceed in the +x-direction. Even when these laser light fluxes pass through the light passing portions 22*b* and 24*b* of the first and second optical plates, the polarizing direction and proceeding direction thereof never change. Namely, these laser light fluxes continue to proceed in the +x-direction as laser lights having a polarizing direction parallel to the y-axis.

As such, the synthesized light flux group made from the light flux group outputted by the first light source 12 and reflected by the reflecting portions 22*a* of the first optical plate 22, the light flux group outputted by the second light source 14 and reflected by the reflecting portions 24*a* of the second optical plate 24, and the light flux group outputted by the third light source 16 and passed inside or outside the condensing mirror 18 has a polarizing direction parallel to the y-axis and proceeds in the +x-direction.

In the following, advantages of the present embodiment will be described. The condenser mirror 18 can synthesize light flux groups outputted by the three light sources 12, 14, and 16 without overlapping these with each other. Therefore, the condenser mirror 18 can increase the density of a light flux group generated by each light source with spatial uniformity and efficiency. Accordingly, the beam-condensing unit 10 can efficiently generate a higher-density light flux group by using, as light sources, the semiconductor laser array stacks that tend to output light flux groups with relatively low densities. Here, as the light sources 12, 14, and 16, light sources other than semiconductor laser array stacks may be used.

Unlike a polarizing beam splitter, the condenser mirror 18 can generate a higher-density light flux group by synthesizing light flux groups from the light sources 12, 14, and 16 with polarizing directions thereof aligned. Accordingly, when the light flux group generated by the beam-condensing unit 10 is used, a solid-state laser medium having polarization density in light absorption, represented by Nd:YLF and Nd:YVO$_4$, can be efficiently excited.

Here, it is preferable that the width of a light flux emitted from each semiconductor laser array 27 and collimated by the collimator lens 20 is equal to or less than the width L/3 of the reflecting portion of the optical plate. In this case, light loss when light fluxes from the light source are reflected by the condenser mirror 18 or pass through the condensing mirror 18 can be prevented, and those light fluxes can be efficiently synthesized.

When any of the three light sources 12, 14, and 16 are removed in the beam-condensing unit 10, it is also possible to synthesize light flux groups outputted by two remaining light sources. In this case as well, the light flux groups outputted by the two light sources can be synthesized so as not to overlap with each other, whereby density of an output light flux group of a single light source can be increased with spatial uniformity and efficiency. Here, in comparison with the case where light fluxes from three light sources are synthesized, there is no change in distance necessary for synthesis. Therefore, even when light flux groups from three light sources are synthesized, there is no such case that a beam pattern greatly diverges in comparison with when light fluxes from two light sources are synthesized and that synthesizing efficiency is thereby deteriorated.

For synthesizing light fluxes from two light sources, when the third light source 16 is removed and only light fluxes from the first and second light sources 12 and 14 are synthesized, by setting the widths of the reflecting portions 22*a* and 24*a* and light passing portions 22*b* and 24*b* of the optical plates to L/2, respectively, and setting the thickness of each semiconductor laser array 27 to L/2, it becomes possible to efficiently increase optical density. Moreover, in the present embodiment, even if the thickness of the semiconductor laser array 27 and the width of the reflecting portions 22*a* and 24*a* are not set to L/3, and the thickness of the laser array loading portion 28*d* and the width of the light passing portions 22*b* and 24*b*, to 2L/3, respectively, it is possible to efficiently increase optical density, as long as the beam-condensing unit 10 is constructed so that the array interval of the semiconductor laser arrays 27 is coincident with the array interval of the optical plates 22 and 24, and a light flux group outputted by each light source is made incident into the corresponding reflecting portions of each optical plate.

In the following, while the present embodiment is compared with a prior art, advantages of the present embodiment will further be described. In the German patent specification DE 197 51 716 C2, a beam-condensing unit that synthesizes light fluxes from three laser array stacks by use of an optical device having a structure in which a first prism plate, an optically transparent plate, and a second prism plate are stacked up in order. The first prism plate receives light fluxes from the first laser array stack and reflects the same in a predetermined direction. The second prism plate receives light fluxes from the second laser array stack and reflects the same in the same direction as that by first prism plate. The optically transparent plate allows light fluxes from the third laser array stack to permeate and proceed in the same direction as that of the light fluxes reflected by the second prism plate. Thereby, light fluxes from the three laser array stacks are synthesized.

However, since the optical device is constructed by the stack of prism plates and a light transmitting plate, alignment with the laser array stacks is difficult. For example, when the stack interval of semiconductor laser arrays in the laser array stack is designed at 1.75 mm, a deviation on the order of –0.05 to +0.05 mm arises in the stack interval. Therefore, in the optical device according to the prior art, light loss increases unless the position of the prism plates and light transmitting plate is adjusted according to such deviation in the stack interval. It requires a great deal of effort to fabricate an optical device by preparing prism plates and a light transmitting plate having thicknesses matched with the respective stack intervals and stacking up while aligning these with the respective semiconductor laser arrays one by one, which is not realistic. Normally, prism plates and a light transmitting plate having thicknesses obtained by equally dividing 1.75 mm into three, however, misalignment occurs between the prism or light transmitting plate and semiconductor laser array, and this results in a large light loss.

In contrast thereto, since the condenser mirror 18 has a structure not by stacking up a plurality of plates but by fitting the two optical plates 22 and 24 together, this can easily cope with a deviation in the stack interval of the semiconductor laser arrays 27. Namely, by measuring stack intervals of the semiconductor laser arrays 27 before fabricating the condensing mirror 18 and forming openings having widths to mach the measured stack intervals on the plates, the optical plates 22 and 24 having the reflecting portions 22a and 24a arranged at intervals corresponding to the respective stack intervals are easily fabricated. The openings can be formed with accuracy by, for example, NC machining using a slicing machine.

Moreover, the condensing mirror 18 according to the present embodiment also has an advantage such that the number of components can be reduced in comparison with the optical device according to the prior art. For example, when three laser array stacks in each of which 25 semiconductor laser arrays are stacked up are prepared and output light fluxes thereof are synthesized, a total of as many as 75 prism plates and light transmitting plates are required in the prior art. In contrast thereto, in the condenser mirror 18, although the number of reflecting portions formed on the optical plates increases, only two optical plates are required. For this reason, the condensing mirror 18 can be fabricated at a low cost.

Furthermore, smallness in the number of components also brings about an advantage such that labor necessary for fabrication and installation of the condenser mirror 18 is small. In the prior art, as much as 75 prism plates and light transmitting plates must be positioned and fixed by a method such as adhesion. In contrast thereto, the condenser mirror 18 can be easily fabricated by merely fitting the two optical plates 22 and 24 together. Since these optical plates can be fabricated with dimensions that allow for a deviation in the stack interval of the semiconductor laser arrays, this allows simply positioning the optical plates.

Second Embodiment

Figure 9:
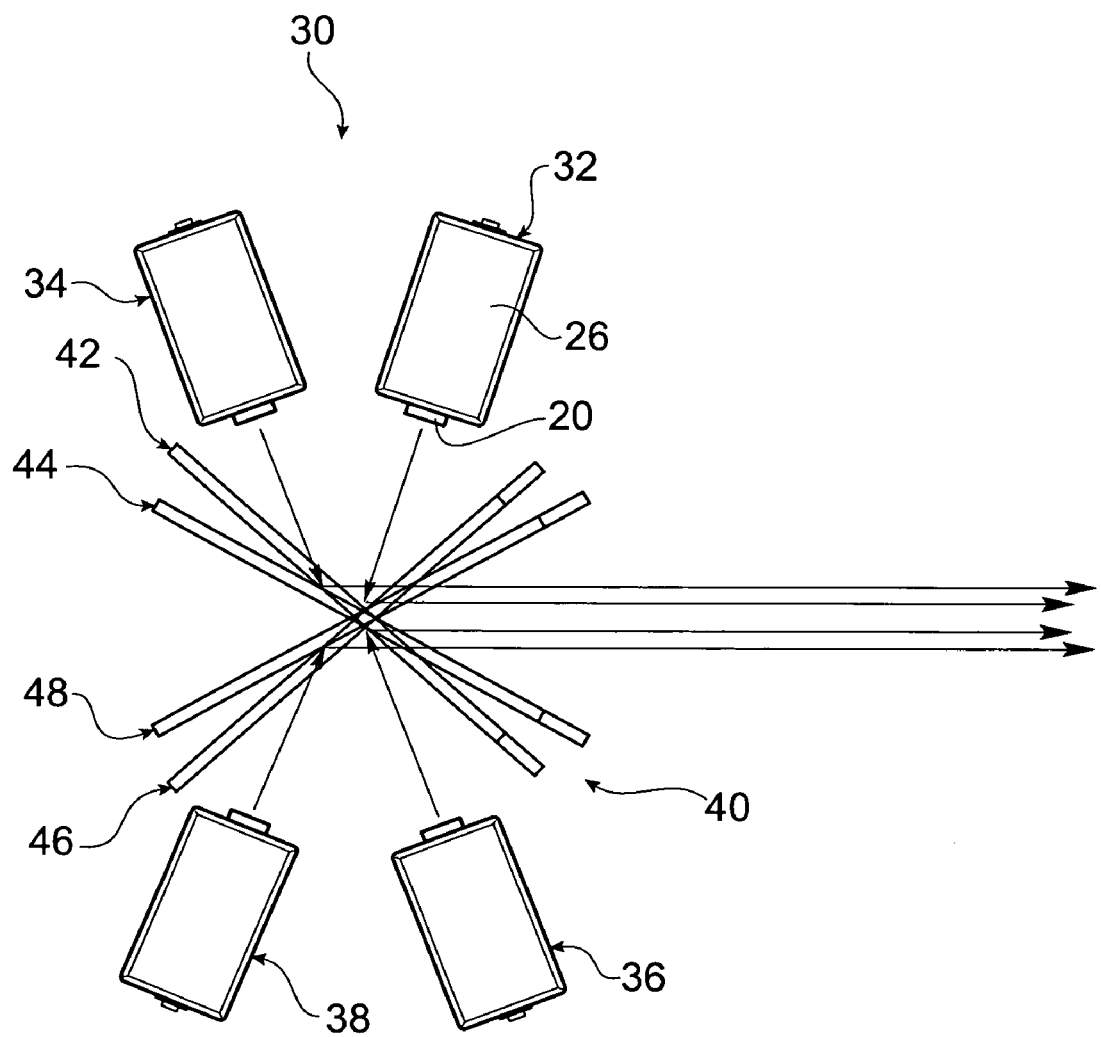
FIG. 9 is a top view of a beam-condensing unit according to a second embodiment.
Figure 10:
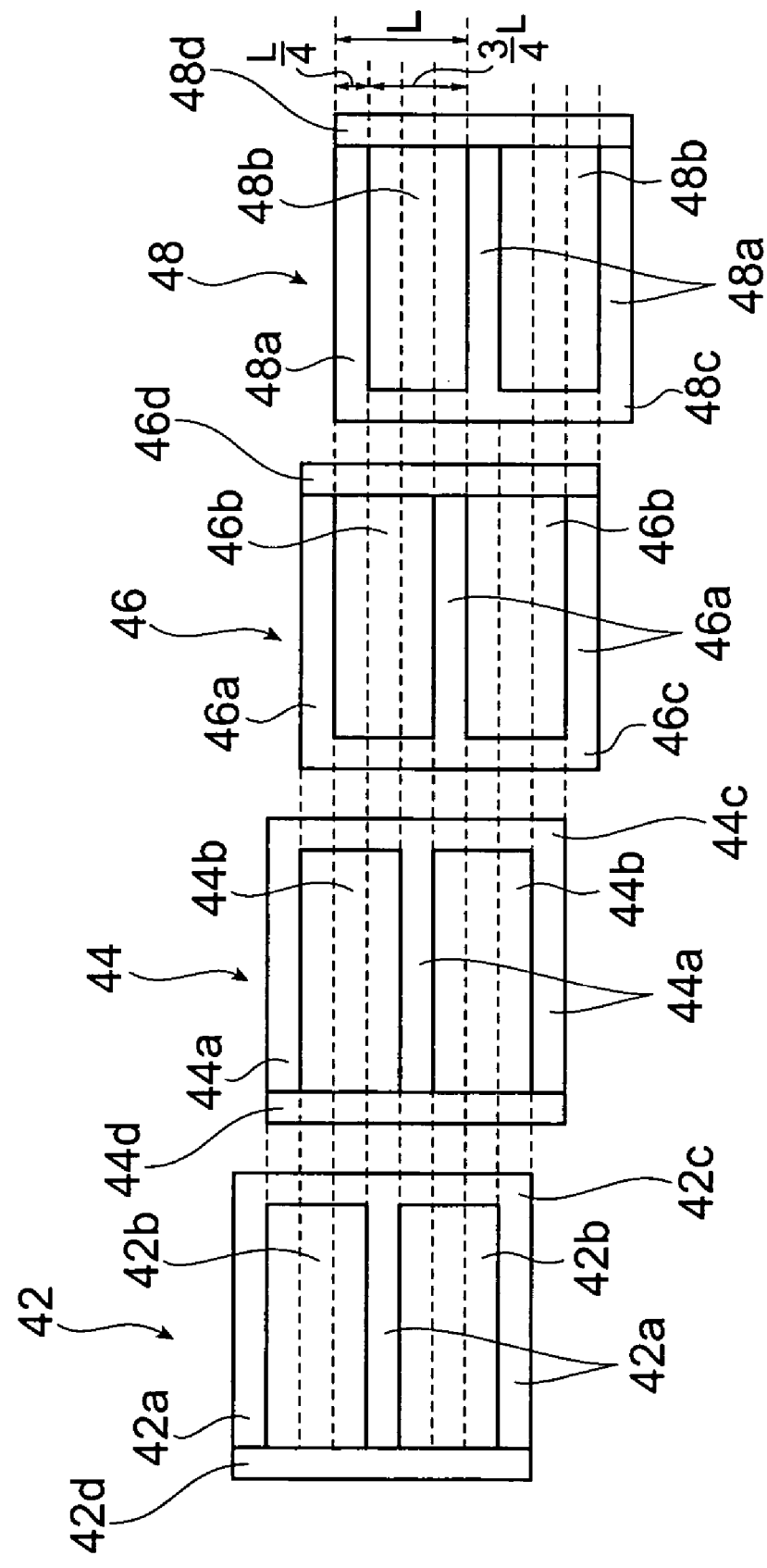
FIG. 10 is a schematic view showing optical plates to construct a condenser mirror.
Figure 11:
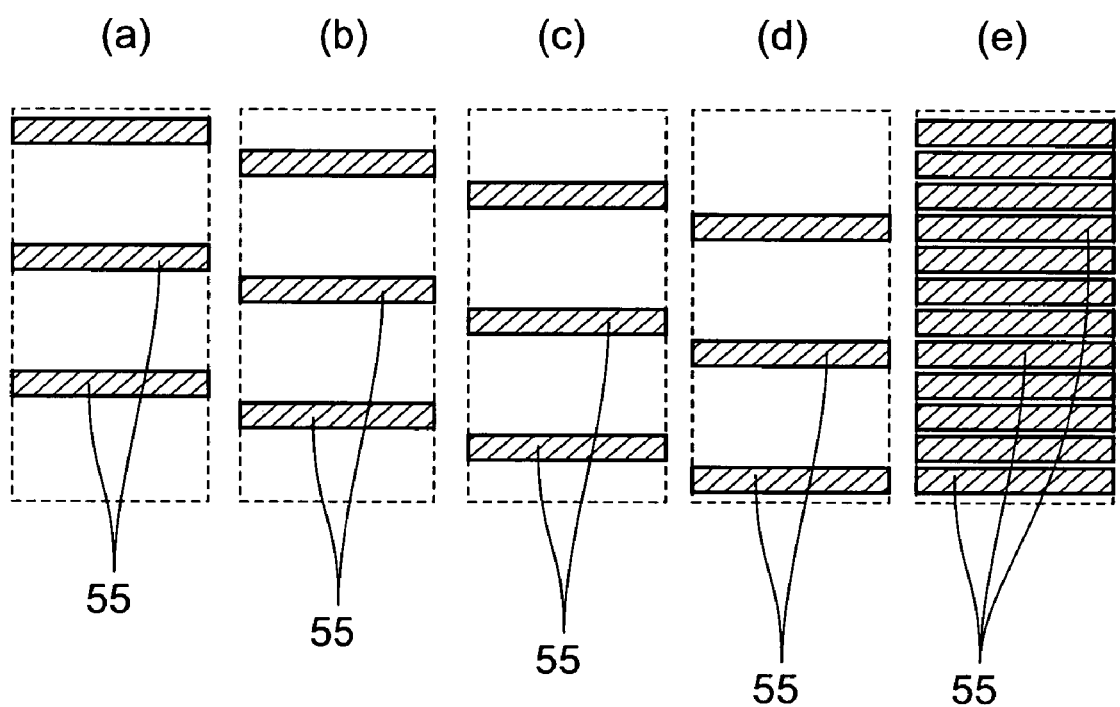
FIG. 11 are views showing a manner that light is synthesized by the beam-condensing unit according to the second embodiment.

In the following, referring to FIG. 9 and FIG. 11, a second embodiment according to the present invention will be described. FIG. 9 is a top view of a beam-condensing unit according to the present embodiment viewed along the z-axis direction, FIG. 10 is a schematic view showing optical plates to construct a condenser mirror used for the beam-condensing unit, and FIG. 11 are views showing a manner that light is synthesized by the beam-condensing unit. The above-mentioned beam-condensing unit 10 is constructed by three light sources and a condenser mirror formed by fitting two optical plates together, whereas a beam-condensing unit 30 is constructed by four light sources and a condenser mirror formed by fitting four optical plates together.

A first light source 32, a second light source 34, a third light source 36, and a fourth light source 38 all have the same structure as the light sources 12, 14, and 16 in the first embodiment. Each of the light sources 32, 34, 36, and 38 has a semiconductor laser stack 26 and a plurality of collimator lenses 20 and outputs parallel light fluxes same in number as semiconductor laser arrays 27 in the light source. A group of these light fluxes forms a striped pattern within a plane vertical to optical axes of these light fluxes. A longitudinal direction of each stripe is equal to the array direction of emitters 29, that is, the slow axis direction of the semiconductor laser array 27.

Each of the light sources 32, 34, 36, and 38 has three semiconductor laser arrays 27, and among these four light sources, the positions of the semiconductor laser arrays 27 are shifted in a fixed order along the z-axis direction. Where the stack interval of the semiconductor laser arrays 27 in the laser array stack 26 is provided as L, the thickness (length in the z-axis direction) of each semiconductor laser array 27 is provided as L/4, and the thickness (length in the z-axis direction) of a laser array loading portion 28d of each heat sink 28 is provided as 3L/4, the positions of the semiconductor laser arrays 27 in the beam-condensing unit 30 are shifted by L/4 along the z-axis direction. More concretely, the four semiconductor laser arrays 27 are arranged without being overlapped while being shifted by L/4 along the z-axis direction in an order of the first light source 32, the second light source 34, the third light source 36, and the fourth light source 38.

As shown in FIG. 10, a condenser mirror 40 is formed by fitting four optical plates 42, 44, 46, and 48 together. The first optical plate 42 has reflecting portions 42a and light passing portions 42b having rectangular planar shapes. The reflecting portions 42a and light passing portions 42b are alternately arrayed in a stripe form along the z-axis direction.

The reflecting portions 42a are provided so as to reflect laser light fluxes from the first light source 32. These reflecting portions 42a have the same dimensions and are arrayed at equal intervals. Of the reflecting portions 42a, surfaces on the +side in the x-axis direction, that is, surfaces opposed to the first light source 32 are provided as mirror surfaces that reflect laser light fluxes.

The light passing portions 42b are provided to allow laser light fluxes from the second to fourth light sources 34, 36, and 38 to pass and are provided as openings in the present invention. These reflecting portions 42a have the same dimensions and are arrayed at equal intervals. The width of the light passing portion 42b is three times the width of the reflecting portion 42a. Where an array interval of the reflecting portions 42a and light passing portions 42b in the first optical plate 42 is provided as L, the width of the reflecting portion 42a is L/4, and the width of the light passing portion 42b is 3L/4. Here, the array interval L is equal to the stack interval of the semiconductor laser arrays 27 in the laser array stack 26.

The first optical plate 42 further has, similar to the optical plates 22 and 24 in the first embodiment, a supporting portion 42c and a support plate 42d. The second optical plate 44, the third optical plate 46, and the fourth optical plate 48 also have the same structure as that of the first optical plate 42 and therefore have reflecting portions 44a, 46a, and 48a, light passing portions 44b, 46b, and 48a , supporting portions 44c, 46c, and 48c, and support plates 44d, 46d, and 48d. These optical plates 42, 44, 46, and 48 are mutually fitted together by inserting the reflecting portions of each optical plate into the light passing portions of another optical plate, whereby the condenser mirror 40 is assembled.

The first optical plate 42 is arranged so that a group of parallel light fluxes outputted by the first light source 32 is made incident into the reflecting portions 42a and is reflected in the +x-direction. Similarly, the second, third and fourth optical plates 44, 46, and 48 are also arranged so that groups of parallel light fluxes outputted by the second, third, and fourth light sources 34, 36, and 38 are made incident into the reflecting portions 44a, 46a, and 48a, respectively, and are reflected in the +x-direction. Accordingly, the optical axis directions of the parallel light fluxes outputted by the light sources 32, 34, 36, and 38 and reflected by the corresponding optical plates 42, 44, 46, and 48 are all identical, that is, the x-axis direction, and these parallel light fluxes proceed in the +x-direction.

Subsequently, actions of the beam-condensing unit 30 and condenser mirror 40 will be described. FIGS. 11(a) to (d) are sectional views where light flux groups emitted from the first light source 32, the second light source 34, the third light source 36, and the fourth light source 38, respectively, are sectioned vertically to their respective optical axes. FIG. 11(e) is a sectional view where a group of parallel light fluxes 55 formed by synthesizing a light flux group emitted from the first light source 32 and reflected by the first optical plate 42, a light flux group emitted from the second light source 34 and reflected by the second optical 44, a light flux group emitted from the third light source 36 and reflected by the third optical plate 46, and a light flux group emitted from the fourth light source 38 and reflected by the fourth optical plate 48 is sectioned vertically to their optical axes.

Since the light flux groups outputted by the respective light sources 32, 34, 36, and 38 have been collimated by the collimator lenses 20, these form, as shown in FIGS. 11(a), (b), (c), and (d), striped patterns where the stripes are parallel to each other and are arrayed at equal intervals. Furthermore, among the light sources 32, 34, 36, and 38, the positions of the semiconductor laser arrays 27 are shifted along the z-direction. In addition, the reflecting portions of the optical plates 42, 44, 46, and 48 are repeatedly arrayed in a fixed order along the z-direction without overlapping with each other. As a result, light flux groups reflected by the reflecting portions proceed in an identical direction (+x-direction) without overlapping with each other, and sections thereof have a pattern as shown in FIG. 11(e). Accordingly, a group of light fluxes formed by synthesizing these reflected light flux groups has a density four times as high as that of the respective light flux groups outputted by the light sources 32, 34, 36, and 38. Each of these light fluxes has a polarizing direction parallel to the y-axis and proceeds in the +x-direction.

Therefore, according to the present invention, light flux groups outputted by four or more light sources are synthesized without overlapping these with each other, whereby density of a light flux group generated by each light source can be increased with spatial uniformity and efficiency.

Here, in the second embodiment, it is preferable that the width of a light flux emitted from each semiconductor laser array and collimated by the collimator lens is equal to or less than the width L/4 of the reflecting portion of the optical plate. In this case, light loss when light fluxes from the light source are reflected by the condenser mirror 40 can be prevented, and those light fluxes can be efficiently synthesized.

The beam-condensing unit 30 synthesizes, similar to the first embodiment, light flux groups from the light sources 32, 34, 36, and 38 with polarizing directions thereof aligned so that a light flux group with a higher density can be generated. Even when the number of light sources is increased, since it is unnecessary to increase the distance necessary for synthesizing light fluxes, deterioration in synthesizing efficiency owing to a beam pattern divergence can be prevented. Moreover, in the present embodiment, even if the thickness of the semiconductor laser array 27 and the width of the reflecting portions 42a 44a, 46a, and 48a are not set to L/4, and the thickness of the laser array loading portion 28d and the width of the light passing portions 42b, 44b, 46b, and 48b, to 3L/4, respectively, it is possible to efficiently increase optical density, as long as the beam-condensing unit 30 is constructed so that the array interval of the semiconductor laser arrays 27 is coincident with the array interval of the optical plates 42, 44, 46 and 48 and a light flux group outputted by each light source is made incident into the corresponding reflecting portions of each optical plate.

The present invention is not limited to the embodiments described above and various modifications are possible. For example, the light passing portions of the optical plates are not limited to openings and may be formed by using an optically transparent substance. For example, after fitting the optical plates used in the above-described embodiments together, the light passing portions thereof may be filled with an optically transparent substance. Moreover, in each embodiment described above, each optical plate includes both the supporting portion and support plate, however, the support plate or both the supporting portion and support plate may be omitted. In addition, the number of light sources used in the beam-condensing unit can be arbitrarily set equal to or more than two. For example, in the second embodiment, the number of light sources and optical plates are both four, however, three or five or more light sources may be used. Also in the construction of the first embodiment, it is possible to provide more light sources and optical plates according to necessity.

A light flux group synthesized by the present invention is not limited to one having a striped pattern as shown in FIG. 12(a). For example, as shown in FIG. 12(b), a light flux group to be synthesized may have a pattern where each stripe 56 is divided into a plurality of parts 57 along its longitudinal direction, in other words, a matrix pattern. Such a light flux group can be obtained by, for example, collimating light fluxes emitted from a plurality of emitters of a semiconductor laser array in each of a stack direction (fast axis direction) of the semiconductor laser arrays and an array direction (slow axis direction) of the emitters so as not to overlap the light fluxes from the emitters with each other in the slow axis direction.

In the first embodiment, the optical axes of output light fluxes of the light sources 12 and 14 are respectively orthogonal to the optical axis of output light fluxes of the light source 16, and the light source 12 and light source 14 therefore face each other. In such an arrangement, there is a possibility that a part of the laser light fluxes emitted from one of the light fluxes 12 and 14 penetrates through the reflecting portions of the optical plate and is irradiated onto the other of the light sources 12 and 14. Such an irradiation possibly damages the light source when the light fluxes are high power. For example, in addition to damaging the emitters 29 by light fluxes directly irradiated onto the emitters 29, there is also a possibility that light fluxes impinge on the heat sinks 28 to raise the temperature thereof, and the life of the semiconductor laser arrays 27 is therefore shortened.

In order to prevent irradiation of light fluxes onto light sources, it is sufficient to incline the optical axes of output light fluxes of the light sources 12 and 14 with respect to the optical axis of output light fluxes of the light source 16 so that the light sources do not face each other. The following are considered when the angle of inclination is set. Namely, 1. Irradiation of light fluxes onto the light sources should be avoided, 2. The light sources should not interfere with each other, and 3. The light sources should be brought as close as possible to each other. The light sources are brought close to each other so as to shorten the optical path and suppress light loss to the minimum. The reason that a short optical pass suppresses light loss is as follows. Light fluxes made incident into the reflecting portions of the condenser mirror 18 have been collimated in the fast axis direction by the collimator lenses 20, however, these are not completely collimated depending on the design of the collimator lenses 20 and the width in the fast axis direction slightly spreads as the light fluxes proceed in some cases. Therefore, the width of light fluxes becomes greater than the width of the reflecting portions and optical loss occurs if the optical path is long.

Figure 13:
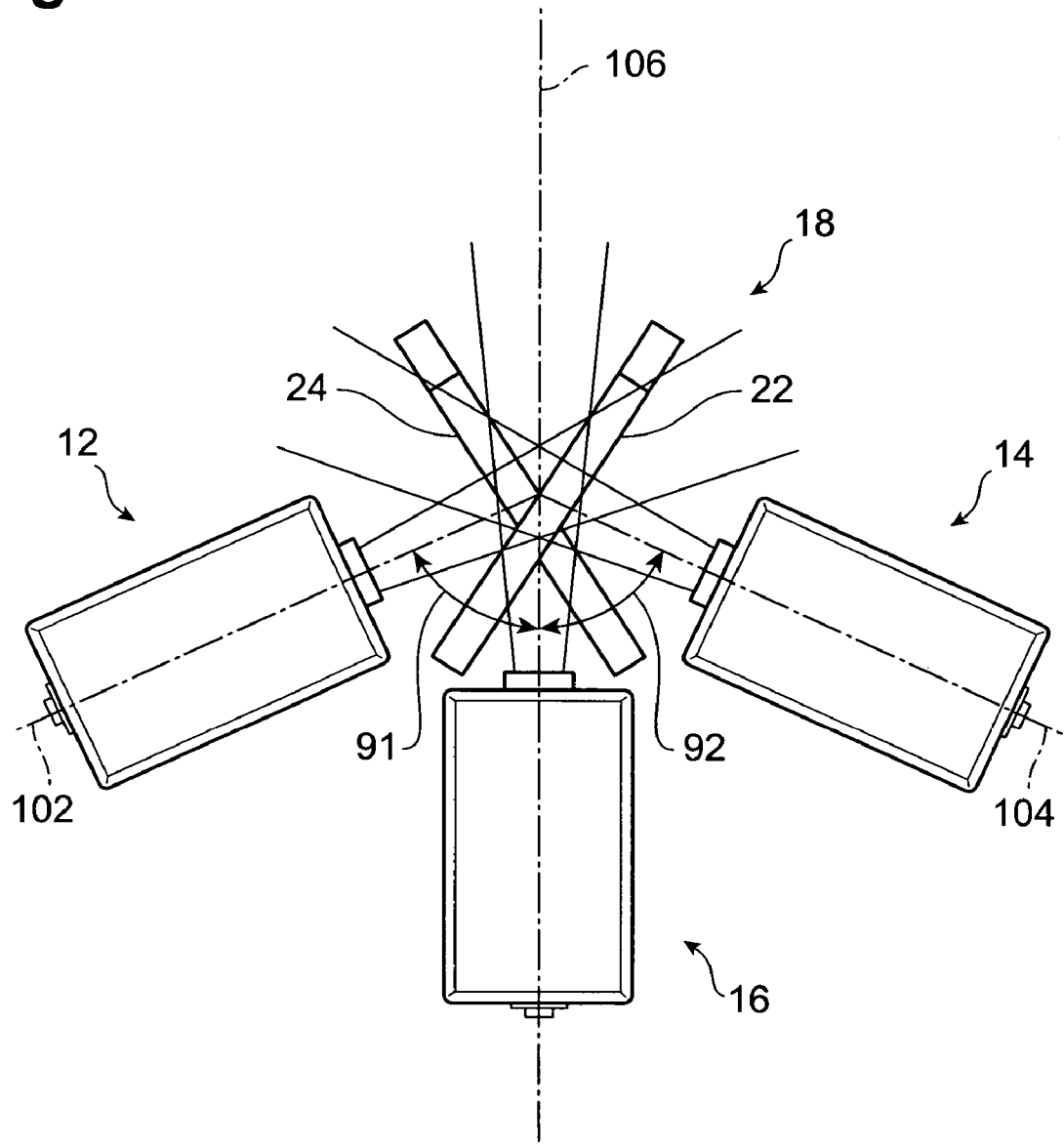
FIG. 13 is a top view showing another example of a beam-condensing unit according to the present invention.
Figure 14:
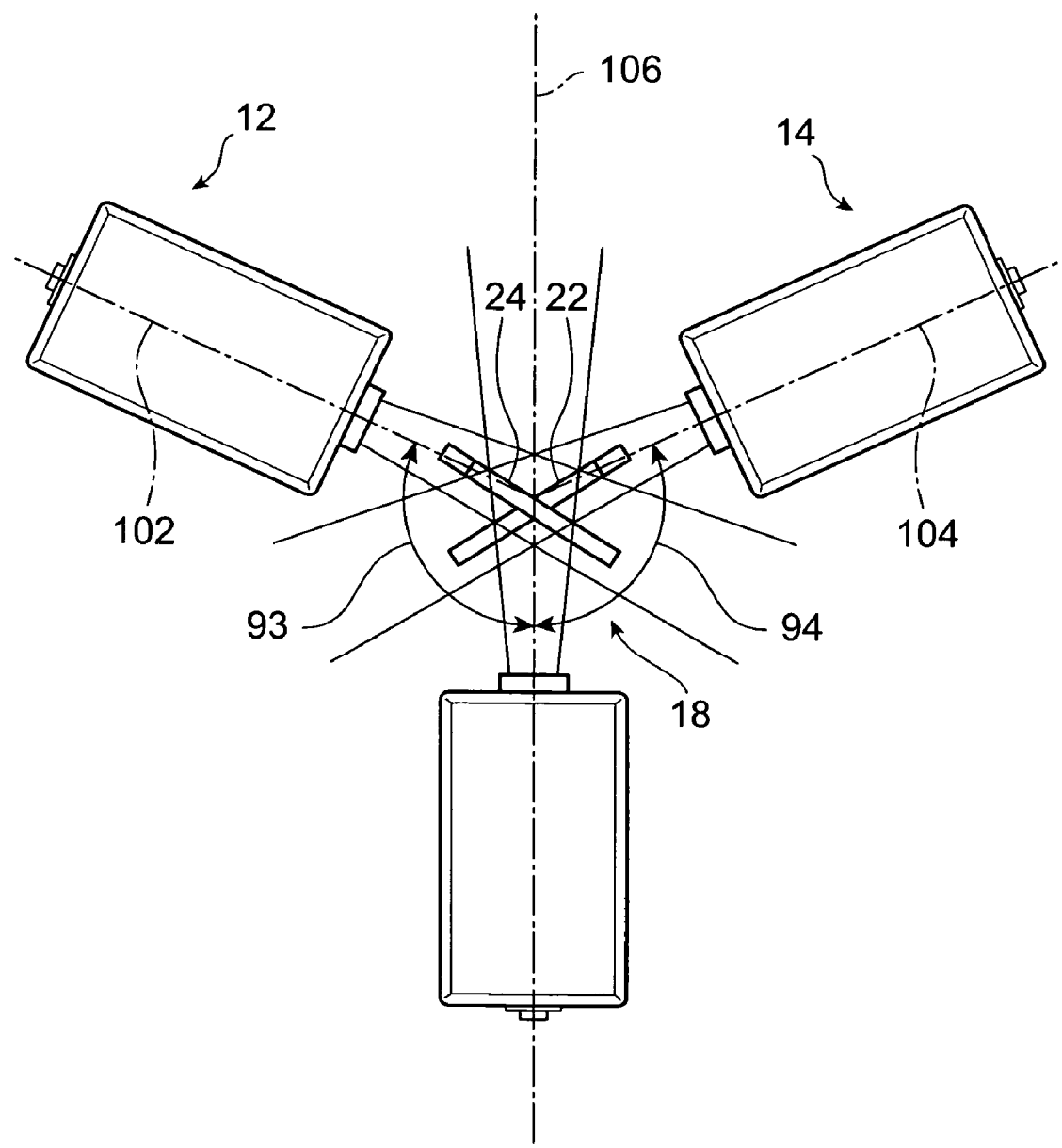
FIG. 14 is a top view showing still another example of a beam-condensing unit according to the present invention.

FIG. 13 and FIG. 14 are top views showing optimal light source arrangements for avoiding damage to light sources. Here, it is provided that the semiconductor laser arrays 27 in each light source have a length of approximately 10 mm in the slow axis direction thereof, and output light fluxes of the semiconductor laser arrays 27 have a divergence angle in the slow axis direction on the order of eight degrees. In FIG. 13 and FIG. 14, the light sources 12 and 14 are arranged in line symmetry with respect to a center axis 106 of the light source 16. The distance from an intersection between center axes 104 and 106 of these light sources to each light source is set to approximately 20 mm. In FIG. 13, an angle 91 formed by the center axis 102 of the light source 12 and the center axis 106 of the light source 16 and an angle 92 formed by the center axis 104 of the light source 14 and the center axis 106 of the light source 16 are both 65 degrees. In FIG. 14, equivalent angles 93 and 94 are both 115 degrees. By employing such an arrangement, irradiation of light fluxes onto the light sources 12, 14, and 16 are avoided, and output light flux groups of the respective light sources can be satisfactorily synthesized.

As is apparent from the invention mentioned above, the embodiments of the present invention may be modified in various ways. Such modifications do not deviate from the scope of the present invention, and as is apparent to those skilled in the art, all such modifications are intended to be included within the scope of the following claims.

INDUSTRIAL APPLICABILITY

According to the present invention, a light flux group with a higher density can be generated by synthesizing a plurality of light flux groups. Moreover, since no polarizing beam splitter is necessary in the present invention, optical density can be increased with the polarizing directions remaining aligned. Therefore, it is possible to efficiently excite a solid-state laser medium having polarization dependency in light absorption, represented by Nd:YLF and Nd:YVO$_4$. Furthermore, the beam-condensing unit and condenser mirror according to the present invention can be fabricated at a relatively low cost, and assembly and installation thereof are also easy.

The invention claimed is:

1. A beam-condensing unit comprising:
a first light source that outputs a plurality of first light fluxes arrayed along a first direction;
a second light source that outputs a plurality of second light fluxes arrayed along the first direction; and
a condenser mirror having first and second optical plates that intersect with each other,
wherein the first optical plate includes a plurality of first reflecting portions that are arrayed along the first direction and reflect the plurality of first light fluxes, respectively, and
the second optical plate includes a plurality of second reflecting portions that are arrayed along the first direction alternately with the first reflecting portions and reflect the plurality of second light fluxes, respectively; and
a third light source that outputs a plurality of third light fluxes arrayed along the first direction,
wherein the condenser mirror has a plurality of light passing portions that are arrayed along the first direction and allow the plurality of third light fluxes to pass, respectively,
the first reflecting portions, the second reflecting portions, and the light passing portions are repeatedly arrayed along the first direction in a fixed order,
the first optical plate has one or more first opening portions arrayed along the first direction alternately with the first reflecting portions,
the second optical plate has one or more second opening portions arrayed along the first direction alternately with the second reflecting portions,
one or more of the first reflecting portions penetrate through the second opening portions, and one or more of the second reflecting portions penetrate through the first opening portions, and
the first and second opening portions include gaps formed between the first and second reflecting portions as the light passing portions.

2. A beam-condensing unit comprising:
a first light source that outputs a plurality of first light fluxes arrayed along a first direction;
a second light source that outputs a plurality of second light fluxes arrayed along the first direction; and
a condenser mirror having first and second optical plates that intersect with each other,
wherein the first optical plate includes a plurality of first reflecting portions that are arrayed along the first direction and reflect the plurality of first light fluxes, respectively, and
the second optical plate includes a plurality of second reflecting portions that are arrayed along the first direction alternately with the first reflecting portions and reflect the plurality of second light fluxes, respectively; and
a third light source that outputs a plurality of third light fluxes arrayed along the first direction,
wherein the condenser mirror further has a third optical plate that intersects with the first and second optical plates, the third optical plate includes a plurality of third reflecting portions that are arrayed along the first direction and reflect the plurality of third light fluxes, respectively, and
the first, second, and third reflecting portions are repeatedly arrayed along the first direction in a fixed order.

3. The beam-condensing unit according to claim 1 or 2, wherein the plurality of first light fluxes have optical axes parallel to each other, and
the plurality of second light fluxes have optical axes parallel to each other, and
the first and second optical plates are arranged so that the optical axes of the first light fluxes reflected by the first reflecting portions become parallel to the optical axes of the second light fluxes reflected by the second reflecting portions.

4. The beam-condensing unit according to claim 1 or 2, wherein each of the first light fluxes has a cross section slender in a second direction vertical to the first direction and is collimated within a plane vertical to the second direction, and
each of the second light fluxes has a cross section slender in a third direction vertical to the first direction and is collimated within a plane vertical to the third direction.

5. The beam-condensing unit according to claim 3, wherein the first light source comprises:
a plurality of first semiconductor laser arrays that are laminated along the first direction and generate the plurality of first light fluxes, respectively; and
a first collimator that receives the plurality of first light fluxes from the plurality of first semiconductor laser arrays and collimates the same within a plane vertical to the second direction, and
the second light source comprises:
a plurality of second semiconductor laser arrays that are laminated along the first direction and generate the plurality of second light fluxes, respectively; and
a second collimator that receives the plurality of second light fluxes from the plurality of second semiconductor laser arrays and collimates the same within a plane vertical to the third direction.

6. The beam-condensing unit according to claim 1 or 2, wherein the first optical plate has one or more first opening portions arrayed along the first direction alternately with the first reflecting portions, and
the second optical plate has one or more second opening portions arrayed along the first direction alternately with the second reflecting portions, and
one or more of the first reflecting portions penetrate through the second opening portions, and one or more of the second reflecting portions penetrate through the first opening portions.

7. The beam-condensing unit according to claim 1 or 2, wherein the plurality of first light fluxes have optical axes parallel to each other,
the plurality of second light fluxes have optical axes parallel to each other,
the plurality of third light fluxes have optical axes parallel to each other, and
the first and second optical plates are arranged so that the third light fluxes pass through the light passing portions and the optical axes of the third light fluxes that have passed through the light passing portions become parallel to the optical axes of the first and second light fluxes reflected by the first and second reflecting portions.

8. The beam-condensing unit according to claim 2, wherein the plurality of first light fluxes have optical axes parallel to each other, and
the plurality of second light fluxes have optical axes parallel to each other, and
the plurality of third light fluxes have optical axes parallel to each other, and
the first, second, and third optical plates are arranged so that the optical axes of the first, second, third light fluxes reflected by the first, second, and third reflecting portions become parallel to each other.

9. The beam-condensing unit according to claim 2, wherein the third optical plate further has one or more third opening portions arrayed along the first direction alternately with the third reflecting portions, and
one or more of the third reflecting portions penetrate through the first and second opening portions, and one or more of the first reflecting portions and one or more of the second reflecting portions penetrate through the third opening portions.

10. The beam-condensing unit according to claim 1 or 2, wherein each of the third light fluxes has a cross section slender in a fourth direction vertical to the first direction and is collimated within a plane vertical to the fourth direction.

11. The beam-condensing unit according to claim 1 or 2, wherein the third light source comprises:
a plurality of third semiconductor laser arrays that are laminated along the first direction and generate the plurality of third light fluxes, respectively; and
a third collimator that receives the plurality of third light fluxes from the plurality of third semiconductor laser arrays and collimates the same within a plane vertical to the fourth direction.

12. A condenser mirror comprising:
a first optical plate having a plurality of first reflecting portions arrayed along the first direction;
a second optical plate that intersects with the first optical plate,
wherein the second optical plate has a plurality of second reflecting portions arrayed along the first direction alternately with the first reflecting portions; and
a third optical plate that intersects with the first and second optical plates,
wherein the third optical plate has a plurality of third reflecting portions arrayed along the first direction and one or more third opening portions arrayed along the first direction alternately with the third reflecting portions,
the first, second, and third reflecting portions are repeatedly arrayed along the first direction in a fixed order, and
one or more of the third reflecting portions penetrate through the first and second opening portions, and one or more of the first reflecting portions and one or more of the second reflecting portions penetrate through the third opening portions.

13. The condenser mirror according to claim 12, wherein the first optical plate has one or more first opening portions arrayed along the first direction alternately with the first reflecting portions, and
the second optical plate has one or more second opening portions arrayed along the first direction alternately with the second reflecting portions, and
one or more of the first reflecting portions penetrate through the second opening portions, and one or more of the second reflecting portions penetrate through the first opening portions.

14. The condenser mirror according to claim 12, further comprising a plurality of light passing portions arrayed along the first direction, wherein the first reflecting portions, the second reflecting portions, and the light passing portions are repeatedly arrayed along the first direction in a fixed order.

15. The condenser mirror according to claim 12, wherein the first optical plate has one or more first opening portions arrayed along the first direction alternately with the first reflecting portions, and the second optical plate has one or more second opening portions arrayed along the first direction alternately with the second reflecting portions, and one or more of the first reflecting portions penetrate through the second opening portions, and one or more of the second reflecting portions penetrate through the first opening portions, and the first and second opening portions include gaps formed between the first and second reflecting portions as the light passing portions.

* * * * *